(12) United States Patent
Hamada

(10) Patent No.: US 9,451,146 B2
(45) Date of Patent: Sep. 20, 2016

(54) FOCUS DETECTING APPARATUS

(71) Applicant: SAMSUNG ELECTRONICS CO., LTD., Suwon-si, Gyeonggi-do (KR)

(72) Inventor: Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 13/758,155

(22) Filed: Feb. 4, 2013

(65) Prior Publication Data

US 2013/0293769 A1 Nov. 7, 2013

(30) Foreign Application Priority Data

May 4, 2012 (KR) .................. 10-2012-0047592

(51) Int. Cl.
*H04N 5/232* (2006.01)
*G03B 13/36* (2006.01)
*G02B 7/28* (2006.01)

(52) U.S. Cl.
CPC .......... *H04N 5/23212* (2013.01); *G02B 7/282* (2013.01); *G03B 13/36* (2013.01)

(58) Field of Classification Search
CPC .............. H04N 5/23212; H04N 13/0409; H04N 9/3164; G02B 6/4214; G02B 7/28; G02B 7/282; G03B 13/36; G03B 17/48; G03B 3/00
USPC ................. 348/335, 340, 342, 345, 370, 371
See application file for complete search history.

(56) References Cited

U.S. PATENT DOCUMENTS

| 4,455,065 A | 6/1984 | Niwa et al. |
| 8,213,787 B2 | 7/2012 | Hamada |
| 2004/0057712 A1* | 3/2004 | Sato et al. ............ 396/89 |
| 2007/0206937 A1* | 9/2007 | Kusaka ................ 396/89 |

FOREIGN PATENT DOCUMENTS

| JP | 57-022210 A | 2/1982 |
| KR | 10-2011-0050924 A | 5/2011 |

* cited by examiner

*Primary Examiner* — Twyler Haskins
*Assistant Examiner* — Carramah J Quiett
(74) *Attorney, Agent, or Firm* — Drinker Biddle & Reath LLP

(57) ABSTRACT

A focus detecting apparatus includes: a lens; a light-transmitting unit; a light-receiving unit; and an optical film that transmits a beam of light passing through the lens and includes a holographic optical element, a diffractive optical element, or a pellicle mirror, wherein a beam of light from the light-transmitting unit is reflected on a reflection mirror including the optical film, passes through a first exit pupil area on one side of an optical axis, and is transmitted to the subject, a beam of reflected light of light irradiated onto the subject passes through a second exit pupil area on another side of the optical axis, is reflected on the reflection mirror and received by the light-receiving unit, and a focal position is obtained using position information of the beam of light received by the light-receiving unit. Autofocusing can be continuously performed during continuous photographing operation and in low brightness environment.

24 Claims, 29 Drawing Sheets

FOCUS DETECTING APPARATUS

CROSS-REFERENCE TO RELATED PATENT APPLICATION

This application claims the priority benefit of Korean Patent Application No. 10-2012-0047592, filed on May 4, 2012, in the Korean Intellectual Property Office, the disclosure of which is incorporated herein in its entirety by reference.

BACKGROUND

Various embodiments of the invention relate to a focus detecting apparatus.

As digital photographing apparatuses, such as digital cameras, camcorders, or the like, have been miniaturized and as technology relating to a battery, or the like, has been developed, digital photographing apparatuses can be easily carried. Thus, an image can be easily captured anywhere. In addition, digital photographing apparatuses provide a wide variety of functions that enable non-professionals to capture a good quality image.

In order to capture a good quality image of a subject, light has to be sufficiently irradiated onto the subject. When light is not sufficiently irradiated onto a subject, it is not easy to focus on the subject and a captured image is dark, and thus it is not easy to recognize the photographed subject. Thus, a lighting device for lighting a subject may be embedded in a digital photographing apparatus or may be separably installed on the digital photographing apparatus as occasion demands.

It is required that a subject be precisely focused on in order to capture a clear still image or a clear moving picture image by using a digital photographing apparatus, such as a camera, a camcorder, or the like. Examples of autofocusing (AF) methods include a contrast AF method and a phase difference AF method.

In the contrast AF method, a photographing operation is performed when a position of a focus lens is changed, a contrast value is obtained from an image signal generated by an image capturing sensor, and the focus lens is driven to a position at which the contrast value is a peak.

In the phase difference AF method, an image capturing sensor and an additional sensing device are disposed, and a focus position is detected from a phase difference in beams of light irradiated onto the sensing device.

SUMMARY

Various embodiments of the invention provide a focus detecting apparatus that may perform autofocusing (AF) continuously during a continuous photographing operation and in a low brightness environment.

According to an embodiment, a focus detecting apparatus includes: an image capturing lens that allows light from a subject to be transmitted through the image capturing lens; a light-transmitting unit that defines a range of beams of transmitted light; a light-receiving unit that defines a range of beams of received light; and an optical film that transmits a beam of light that has passed through the image capturing lens and includes one selected from the group consisting of a holographic optical element, a diffractive optical element, and a pellicle mirror, wherein a beam of light from the light-transmitting unit is reflected on a reflection mirror including the optical film, passes through a first exit pupil area on one side of an optical axis of the image capturing lens, and is transmitted to the subject, and a beam of reflected light of light irradiated onto the subject passes through a second exit pupil area on another side of the optical axis of the image capturing lens, is reflected on the reflection mirror including the optical film, and is received by the light-receiving unit, and a focal position is obtained using information regarding a position of the beam of light received by the light-receiving unit.

Each of the first and second exit pupil areas may be defined in a range of a particular F-value of the image capturing lens.

The particular F-value may be smaller than a minimum open F-value of the image capturing lens.

The optical film may reflect the beam of transmitted light and the beam of received light using one screen.

The focal position may be obtained based on a phase difference between the beam of transmitted light and the beam of received light.

A quantity of deviation from the focal position of the image capturing lens may be obtained by performing an arithmetic operation on a variation in relative positions of the beam of transmitted light and the beam of received light on a conjugate plane of an image capturing plane.

According to another embodiment, a focus detecting apparatus includes: an image capturing lens that allows light from a subject to be transmitted through the image capturing lens; a light-transmitting unit that defines a range of beams of transmitted light; a light-receiving unit that defines a range of beams of received light; and an optical film that transmits a beam of light that has passed through the image capturing lens, wherein a beam of light from the light-transmitting unit is reflected on a reflection mirror including the optical film, passes through a first exit pupil area on one side of an optical axis of the image capturing lens, and is transmitted to the subject, and a beam of reflected light of light irradiated onto the subject passes through a second exit pupil area on another side of the optical axis of the image capturing lens, is reflected on the reflection mirror including the optical film, and is received by the light-receiving unit, and a focal position is obtained using information regarding a position of the beam of light received by the light-receiving unit, and each of the first and second exit pupil areas is defined in a range of a particular F-value of the image capturing lens.

The particular F-value may be smaller than a minimum open F-value of the image capturing lens.

The optical film may reflect the beam of transmitted light and the beam of received light using one screen.

The optical film may include an optical element that non-specularly reflects the beam of transmitted light and the beam of received light.

The optical film may include an optical element that reflects only light having a particular wavelength and may be located between the image capturing lens and an image capturing plane.

The optical element may include a holographic optical element or a diffractive optical element.

The focal position may be obtained based on a phase difference between the beam of transmitted light and the beam of received light.

A quantity of deviation from the focal position of the image capturing lens may be obtained by performing an arithmetic operation on a variation in relative positions of the beam of transmitted light and the beam of received light on a conjugate plane of the image capturing plane.

The light-receiving unit may include a position sensitive device (PSD), an area sensor (AD), or a line sensor.

The light-receiving unit may be disposed at a position in a conjugate plane of the image capturing plane.

The light-receiving unit may include a line sensor, and the line sensor may be disposed in a line arrangement direction that is perpendicular to an optical axis of an image-capturing lens.

The light-receiving unit may include an area sensor and detects a focus by detecting a central position of reflected light that is moving.

The light-transmitting unit may undergo modulation, and the light-receiving unit may detect a focus by detecting a central position of received light from a difference between a light-transmitting output and a light-receiving output in synchronization with modulation of the light-transmitting unit.

According to another embodiment, there is provided a focus detecting apparatus includes: an image capturing lens that allows light from a subject to be transmitted through the image capturing lens; a light-transmitting unit that defines a range of beams of transmitted light; a light-receiving unit that defines a range of beams of received light; and an optical film that transmits a beam of light that has passed through the image capturing lens, wherein a beam of light from the light-transmitting unit is reflected on a reflection mirror including the optical film, passes through a first exit pupil area on a first side of an optical axis of the image capturing lens, and is transmitted to the subject, and a beam of reflected light of light irradiated onto the subject passes through a second exit pupil area on a second side of the optical axis of the image capturing lens, is reflected on the reflection mirror including the optical film, and is received by the light-receiving unit, and a beam of reflected light of light irradiated onto the subject passes through a third exit pupil area on a third side of the optical axis of the image capturing lens, is reflected on the reflection mirror including the optical film, and is received by the light-receiving unit, and a focal position is obtained using information regarding a position of the beam of light from the second exit pupil area or the third exit pupil received by the light-receiving unit, and each of the first through third exit pupil areas is defined in a range of a particular F-value of the image capturing lens.

Beams of light having different F-values may be irradiated onto the second exit pupil area and the third exit pupil area.

According to another embodiment, a focus detecting apparatus includes: an image capturing lens that allows light from a subject to be transmitted through the image capturing lens; a light-transmitting unit including a plurality of light-transmitting elements that define a range of beams of transmitted light; a light-receiving unit that defines a range of beams of received light; and an optical film for transmitting a beam of light that has passed through the image capturing lens, wherein a beam of light from the light-transmitting unit is reflected on a reflection mirror including the optical film, passes through a first exit pupil area on one side of an optical axis of the image capturing lens, and is transmitted to the subject, and a beam of reflected light of light irradiated onto the subject passes through a second exit pupil area on another side of the optical axis of the image capturing lens, is reflected on the reflection mirror including the optical film, and is received by the light-receiving unit, and a focal position is obtained using information regarding a position of the beam of light from the second exit pupil area or the third exit pupil received by the light-receiving unit, and lights transmitted from the plurality of light-transmitting elements are disposed to be transmitted through a plurality of subject areas.

Lights transmitted from the plurality of light-transmitting elements may be sequentially emitted, and the light-receiving unit may detect a position of the received light that is synchronized with the transmitted lights.

The light-receiving unit may include an area sensor and detects a focus by detecting a central position of reflected light that is moving.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
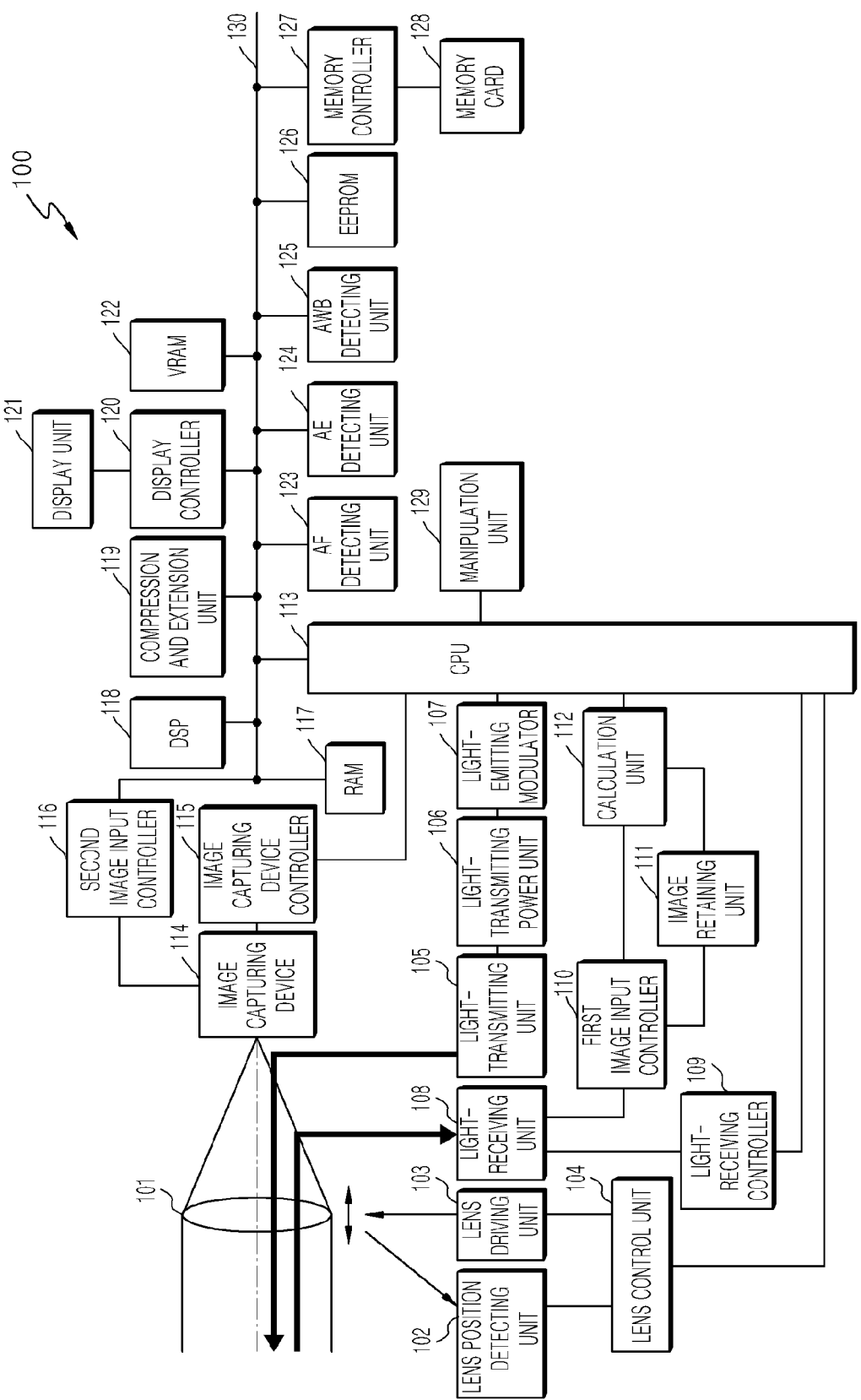
FIG. 1 is a block diagram of a structure of a digital photographing apparatus, according to an embodiment.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of various embodiments of the invention, certain detailed explanations of related art are omitted when it is deemed that they may unnecessarily obscure the essence of the invention.

Various embodiments of the invention will be described below in more detail with reference to the accompanying drawings, in which exemplary embodiments of the invention are shown. Those components that are the same or are in correspondence are rendered the same reference numeral regardless of the figure number, and redundant explanations are omitted.

FIG. 1 is a block diagram of a structure of a digital photographing apparatus 100, according to an embodiment.

Referring to FIG. 1, the digital photographing apparatus 100 includes an image capturing lens 101, a lens position detecting unit 102, a lens driving unit 103, a lens control unit 104, a light-transmitting unit 105, a light-transmitting power unit 106, a light-emitting modulator 107, a light-receiving unit 108, a light-receiving controller 109, a first image input controller 110, an image retaining unit 111, a calculation unit 112, a central processing unit (CPU) 113, an image capturing device 114, an image capturing device controller 115, a second image input controller 116, random access memory (RAM) 117, a digital signal processor (DSP) 118, a compression and extension unit 119, a display controller 120, a display unit 121, video RAM (VRAM) 122, an autofocusing (AF) detecting unit 123, an auto exposure (AE) detecting unit 124, an auto white balance (AWB) detecting unit 125, electrically erasable programmable read-only memory (EEPROM) 126, a memory controller 127, a memory card 128, a manipulation unit 129, and a bus line 130.

The image capturing lens 101 includes a focus lens and may perform focusing by driving the focus lens.

The lens position detecting unit 102 detects a position of the focus lens and transmits data regarding the position of the focus lens to the lens control unit 104, and the lens driving unit drives the focus lens according to a control signal or data of the lens control unit 104.

The lens control unit 104 controls an operation of the lens driving unit 103 and receives the data regarding the position of the focus lens. In addition, the lens control unit 104 exchanges information regarding focus detection by communicating with the CPU 113.

The light-transmitting unit 105 irradiates light that is used to perform through the lens (TTL) active AF, onto a subject. The light-transmitting unit 105 defines a range of a beam of light irradiated onto the subject. For example, the light-transmitting unit 105 passes through an exit pupil area located at one side of an optical axis of the image capturing lens 101 so as to transmit light to the subject.

The light-transmitting unit 105 may include a light emitting diode (LED), a laser diode (LD), or the like.

The light-transmitting power unit 106 supplies power to the light-transmitting unit 105. The light-transmitting power unit 106 adjusts the quantity of power supplied to the light-transmitting unit 105 according to a control signal or data of the light-emitting modulator 107 so as to adjust the intensity of light emitted from the light-transmitting unit 105.

The light-emitting modulator 107 receives instructions for emission patterns formed by the light-transmitting unit 105 from the CPU 113 so as to perform TTL active AF. The light-emitting modulator 107 controls the light-transmitting power unit 106 to adjust the quantity of the power supplied to the light-transmitting unit 105 based on the instructions received from the CPU 113.

The light-receiving unit 108 receives external light that is incident through the image capturing lens 101. In this case, the light-receiving unit 108 uses light that is incident through the exit pupil area, through which light emitted from the light-transmitting unit 105 passes, and light that is incident through another exit pupil area. The light-receiving unit 108 may include a light-receiving element or a light-receiving sensor.

The light-receiving unit 108 may receive only general external light, or light to which the light irradiated by the light-transmitting unit 105 is added, based on a light-receiving time.

The exit pupil areas used in the light-transmitting unit 105 and the light-receiving unit 108 may be defined in a range of a particular F-value.

The light-receiving controller 109 may control the light-receiving unit 108 to erase charges accumulated on the light-receiving unit 108 by resetting the light-receiving unit 108 or to output the charges accumulated on the light-receiving unit 108 to the first image input controller 110.

The first image input controller 110 transmits image data that is generated from the charges output from the light-receiving unit 108 to the image retaining unit 111 or the calculation unit 112. For example, the first image input controller 110 may transmit image data regarding light received by the light-receiving unit 108 to the image retaining unit 111, wherein the light is the sum of general external light and light for AF that is irradiated by the light-transmitting unit 105. In addition, the first image input controller 110 may transmit image data regarding the general external light of the light received by the light-receiving unit 108 to the calculation unit 112.

The image retaining unit 111 stores the image data generated from the charges output from the light-receiving unit 108 temporarily and transmits the stored image data to the calculation unit 112.

The calculation unit 112 calculates a phase difference by comparing the image data transmitted from the image retaining unit 111 with the image data transmitted directly from the first image input controller 110. In detail, the calculation unit 112 calculates a difference between the image data generated due to the light for AF irradiated by the light-transmitting unit 105 and the image data generated due to the general external light and integrates the calculated difference. The calculation unit 112 performs the above-described arithmetic operation repeatedly and performs a focus detecting arithmetic operation using a final integral value.

The light-transmitting unit 105, the light-transmitting power unit 106, the light-emitting modulator 107, the light-receiving unit 108, the light-receiving controller 109, the first image input controller 110, the image retaining unit 111, and the calculation unit 112 may constitute a focus detecting apparatus that has a through the lens (TTL) structure and performs phase difference AF, that is, an active AF method.

The CPU controls the entire operation of the digital photographing apparatus 100.

The image capturing device 114 captures image light of the subject that passes through the image capturing lens 101 and generates an image signal. The image capturing device 114 may include a plurality of photoelectric conversion devices arranged in the form of a matrix, and a charge transmission path on which charges are moved from the photoelectric conversion devices.

The image capturing device controller 115 generates a timing signal and applies the timing signal to the image capturing device 114, thereby controlling an image capturing operation of the image capturing device 114. In addition, if charge accumulation is completed in each of the scan lines of the image capturing device 114, the image capturing device controller 115 then controls the image capturing device 114 to sequentially read image signals from the image capturing device 114.

AF processing, AE processing, and AWB processing are performed on an image signal output from the second image input controller 116 by using the AF detecting unit 123, the AE detecting unit 124, and the AWB detecting unit 125, respectively. In this case, the AF detecting unit 123 performs a contrast AF operation of detecting a focal position by calculating a contrast evaluation value.

Although not shown, the image capturing device 114 or the second image input controller 116 may include a configuration for removing noise from the image signal read from the image capturing device 114, a configuration for amplifying a magnitude of a signal, and an analog-to-digital (ND) converter for converting an analog signal into a digital signal.

The RAM stores the image signal output from the second image input controller 116, or various data temporarily.

The DSP performs a series of image signal processings, such as gamma correction, on the image signal output from the second image input controller 116 to generate a live view image or a captured image that may be displayed by the display unit 121. In addition, the DSP 118 may perform white balance control on a captured image according to a white balance gain detected by the AWB detecting unit 125.

The compression and extension unit 119 performs compression and extension of an image signal on which image signal processing has been performed. In the case of compression, the compression and extension unit 119 compresses the image signal in a compression format, such as a JPEG compression format or an H.264 compression format. An image file including image data generated by the compression processing is transmitted to the memory controller 127, and the memory controller 127 stores the image file in the memory card 128.

The display controller 120 controls output of an image to the display unit 121. The display unit 121 displays an image, such as a captured image or a live view image, or various setting information. The display unit 121 and the display controller 120 may include a liquid crystal display (LCD) and an LCD driver. However, embodiments of the invention are not limited thereto, and the display unit 121 and the display controller 120 may be an organic electroluminescent display (OELD) and a driving unit thereof, or the like.

The VRAM 122 stores information, such as an image to be displayed on the display unit 121 temporarily, and the EEPROM 126 may store an execution program for controlling the digital photographing system 100 or various management information.

The manipulation unit 129 is a unit for a user to input various commands in order to manipulate the digital photographing system 1. The manipulation unit 129 may include various buttons, such as a shutter release button, a main switch, a mode dial, a menu button, and the like.

The bus line 130 is a line through which various data or signals are transmitted.

Although not shown, the digital photographing apparatus 100 according to the present embodiment may use an interchangeable lens.

The digital photographing apparatus 100 according to the present embodiment includes both a phase difference AF unit and a contrast AF unit. That is, hybrid AF may be performed. In addition, as such, the digital photographing apparatus 100 may constitute a system that has advantages of an active AF method and advantages of a passive AF method and supplements their disadvantages.

FIGS. 2A through 2D are views schematically illustrating digital photographing apparatuses 200, 210, 220, and 230, according to other embodiments. In FIGS. 2A through 2D, only portions necessary for description are shown.

Figure 2A:
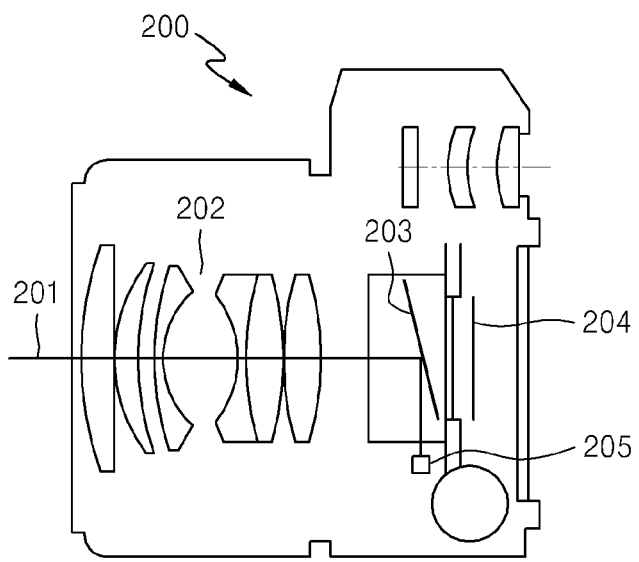
FIGS. 2A through 2D are views schematically illustrating digital photographing apparatuses, according to other embodiments.

Referring to FIG. 2A, the digital photographing apparatus 200 includes an image capturing lens 202, an optical film 203, an image capturing device 204, and a light-transmitting and light-receiving unit 205. Reference numeral 201 denotes an optical axis of the image capturing lens 202. The optical film 203 is installed to be inclined toward the optical axis. The optical film 203 is a thin screen and may be a holographic optical element (HOE).

Light that is incident on the image capturing lens 202 passes through the image capturing lens 202, is incident on the optical film 203 in a direction parallel to the optical axis, and is reflected to a portion below the image capturing lens 202 in a vertical direction. The reflected light is irradiated onto a light-receiving unit 205 installed at a position at which the light may be received.

Figure 2B:
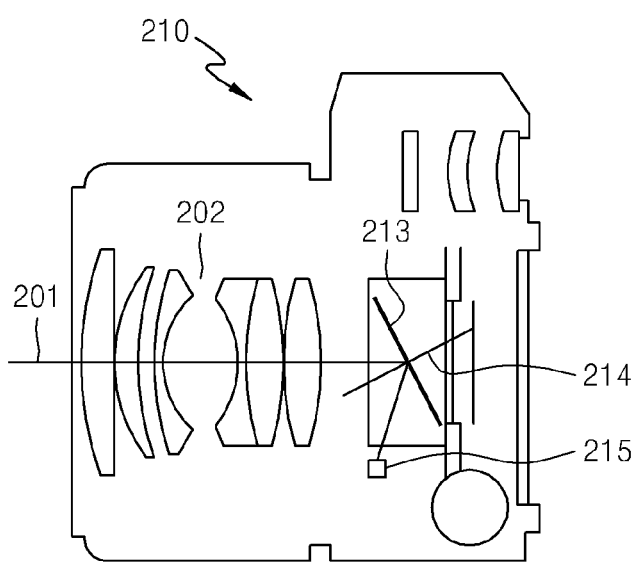

Referring to FIG. 2B, the digital photographing apparatus 210 includes an image capturing lens 202, an optical film 213, and a light-transmitting and light-receiving unit 215. Reference numeral 214 denotes a line that is perpendicular to the optical film 213. The optical film 213 is installed to be more inclined toward the optical axis 201 in the current embodiment than in FIG. 2A.

Light that is incident on the image capturing lens 202 passes through the image capturing lens 202, is incident on the optical film 213 in a direction parallel to the optical axis, and is reflected in a direction more inclined toward the image capturing lens 202 than toward a portion below the image capturing lens 202 in a vertical direction. Thus, a light-receiving unit is disposed closer to the image capturing lens 202 in the current embodiment than in FIG. 2A.

When an incidence angle and a reflection angle of light are the same, the optical film 213 may be an HOE, a diffractive optical element (DOE), or a pellicle mirror. However, when an incidence angle and a reflection angle of light are not the same and are asymmetric with each other, the optical film 213 may be an HOE or a DOE.

Figure 2C:
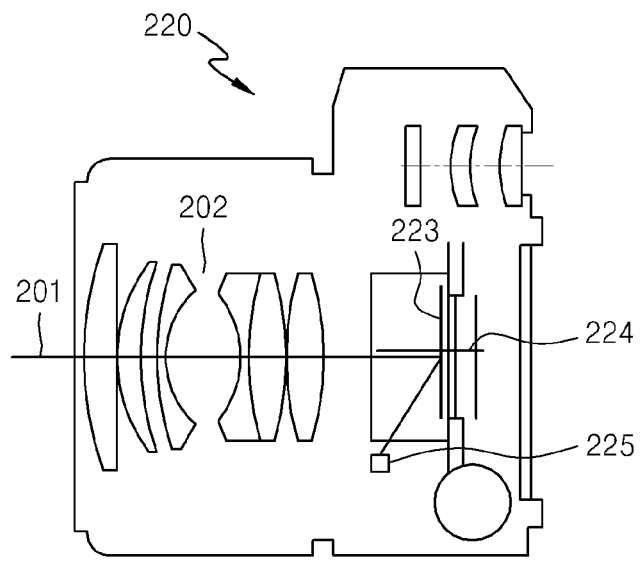

Referring to FIG. 2C, the digital photographing apparatus 220 includes an image capturing lens 202, an optical film 223, and a light-transmitting and light-receiving unit 225. Reference numeral 224 denotes a line that is perpendicular to the optical film 223. In the current embodiment, the optical film 223 is installed to be perpendicular to the optical axis 201.

Light that is incident on the image capturing lens 202 passes through the image capturing lens 202 and then is incident on the optical film 223 in a direction that is parallel to the optical axis. The incidence light does not return to the incident path but is reflected to a portion below the image capturing lens 202 in a vertical direction.

Since the incidence angle and the reflection angle of the light are different from each other, the optical film 223 may be an HOE. Since the optical film 223 is vertically installed, a space inside the digital photographing apparatus 220 may be obtained. Thus, a degree of freedom of designing an interchangeable lens may be improved. In addition, the quality of a captured image may be improved.

Figure 2D:
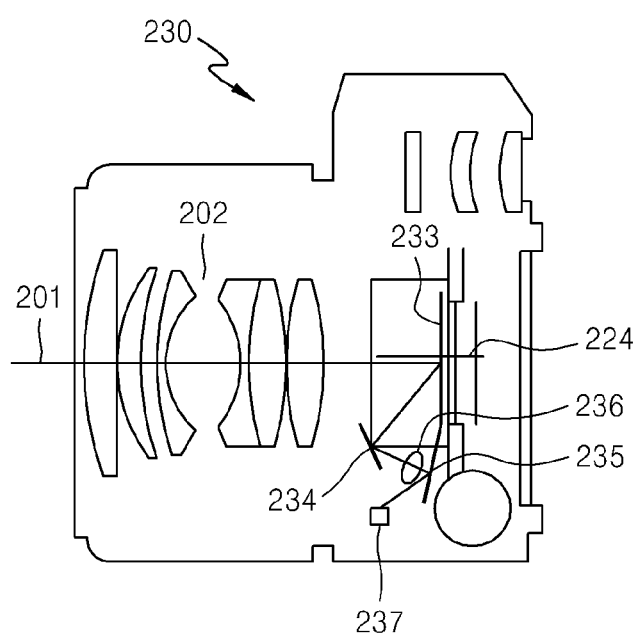

Referring to FIG. 2D, the digital photographing apparatus 230 includes an image capturing lens 202, an optical film 233, a first sub mirror 234, a second sub mirror 235, a condenser lens 236, and a light-transmitting and light-receiving unit 237. Reference numeral 224 denotes a line that is perpendicular to the optical film 233. The optical film 233 is installed to be perpendicular to the optical axis 201.

In the current embodiment, since the digital photographing apparatus 230 further includes the first and second sub mirrors 234 and 235 as compared to the embodiment of FIG. 2C, a reflection angle of the optical film 233 may be reduced. However, since an optical path increases, the condenser lens 237 is used.

Like in FIG. 2C, since the incidence angle and the reflection angle of the light are different from each other, an HOE may be used as the optical film 233. Since the optical film 233 is vertically installed, a space inside the digital photographing apparatus 220 may be obtained. Thus, a degree of freedom of designing an interchangeable lens may be improved. In addition, the quality of a captured image may be improved.

Figure 3A:
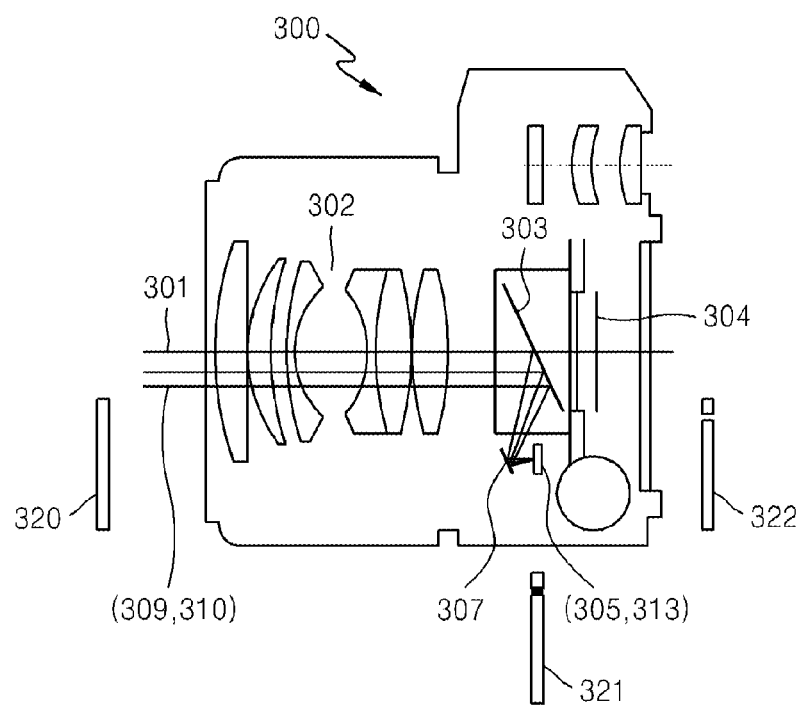
FIG. 3A is a view of a structure of a digital photographing apparatus, according to another embodiment.
Figure 3B:
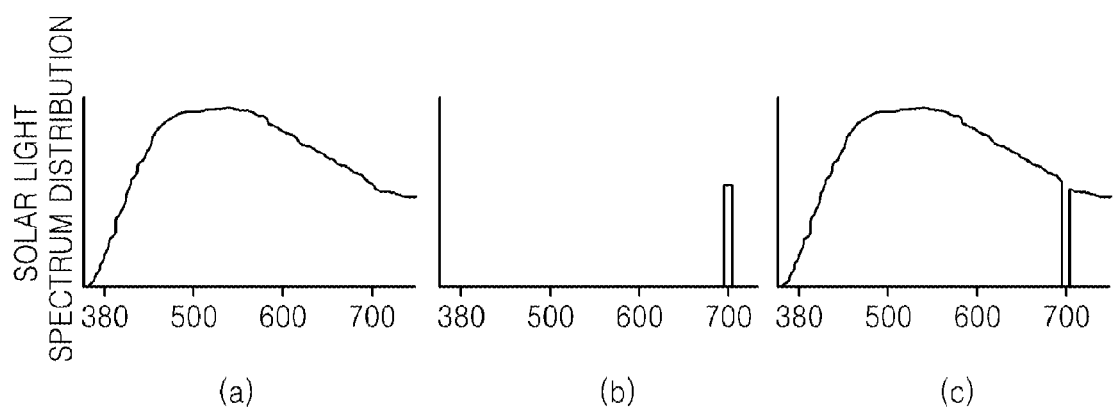
FIG. 3B is a graph of spectrum distribution of solar light according to wavelengths.
Figure 4:
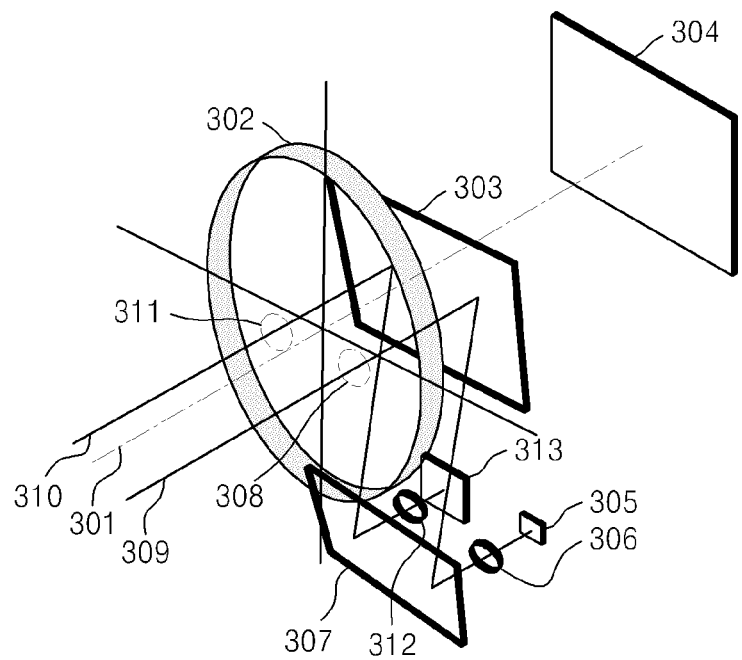
FIG. 4 is a view of a focus detecting apparatus of the digital photographing apparatus illustrated in FIG. 3A, according to an embodiment.

FIG. 3A is a view of a structure of a digital photographing apparatus 300, according to another embodiment. FIG. 3B is a graph of spectrum distribution of solar light according to wavelengths. FIG. 4 is a view of a focus detecting apparatus of the digital photographing apparatus 300 illustrated in FIG. 3A.

Referring to FIGS. 3A and 4, the digital photographing apparatus 300 includes an image capturing lens 302, an optical film 303, an image capturing device 304, a light-transmitting unit 305, a light-receiving unit 313, a reflection mirror 307, a light-transmitting lens 306, and a light-receiving lens 312. Reference numeral 301 denotes an optical axis of the image capturing lens 302, reference numeral 309 denotes an optical path used by the light-transmitting unit 305, and reference numeral 310 denotes an optical path used by the light-receiving unit 313. In this case, the light-transmitting lens 306 and the light-receiving lens 312 limit F-values of a beam of transmitted light and a beam of received light to particular values.

The light-transmitting unit 305 generates light for an LED lamp, or light for AF. The light-transmitting unit 305 generates only light having a predetermined wavelength, for example, 700 nm, as light for AF.

The light generated by the light-transmitting unit 305 passes through the light-transmitting lens 306, is reflected by the reflection mirror 307 and the optical film 303, and is irradiated to the outside via a first exit pupil area 308 in a range of a particular F-value of the image capturing lens 302. In this case, the optical film 303 is designed to reflect only light having the same wavelength as that of the light generated by the light-transmitting unit 305. In the current embodiment, an HOE, a pellicle mirror, or the like is used as the optical film 303.

Light that is irradiated outside is reflected by the subject, and part of the reflected light passes through a second exit pupil area 311 in a range of the particular F-value of the image capturing lens 302 and is incident on the digital photographing apparatus 300. In this case, the incidence light includes external visible radiation and thus includes light having various wavelengths. However, the optical film 303 reflects only light for AF having a particular wavelength, for example, 700 nm.

Light having a wavelength of 700 nm is reflected by the optical film 303 and the reflection mirror 307, passes through the light-receiving lens 312, and is applied to the light-receiving unit 313. An area sensor, a position-sensitive detector (PSD) sensor, a line sensor, or the like may be used as the light-receiving unit 313.

Optical paths for emitted light and incidence light pass through an area under the optical axis. That is, the first exit pupil area 308 and the second exit pupil area 311 are in a lower semicircular region of the image capturing lens 302.

TTL active AF may be performed using the above-described method. In this case, a wavelength of light in each of regions is distributed as follows.

Reference numeral 320 of FIG. 3A denotes wavelength distribution of external light. The external light includes reflected light generated by solar light and thus includes light having various wavelengths. A detailed description thereof is present in (a) of FIG. 3B. The horizontal axis represents wavelength, and the vertical axis represents spectrum distribution of solar light (intensity of solar light).

Reference numeral 321 of FIG. 3A denotes wavelength distribution of light reflected by the optical film 303 and light that is incident on the light-receiving unit 313. In the optical film 303, since only light having a particular wavelength that is used in light for AF is reflected, only light having the particular wavelength is distributed. A detailed description thereof is present in (b) of FIG. 3B. For example, only light having a particular wavelength of 700 nm is spectrum distributed. The light is reflected with a diffraction efficiency of 95% or more.

Reference numeral 322 of FIG. 3A denotes wavelength distribution of light that is incident on the image capturing device 304. In general, the image capturing device 304 is designed to have incident thereon light having a distribution relatively close to that that a human being senses. In addition to this, light having wavelengths other than the wavelength of light reflected by the optical film 303 is incident on the image capturing device 304. A detailed description thereof is present in (c) of FIG. 3B. For example, only light having the wavelength of 700 nm is not distributed. In addition, an infrared filter may be disposed in front of an image sensor, and while a wavelength that is equal to or greater than 700 nm is not passed, light having a wavelength less than 700 nm is irradiated onto the image sensor.

In this way, light having a predetermined wavelength is removed but an effect on the image capturing device 304 with respect to an image is very small and thus the quality of an image obtained by the image capturing device 304 is not lowered.

Figure 5A:
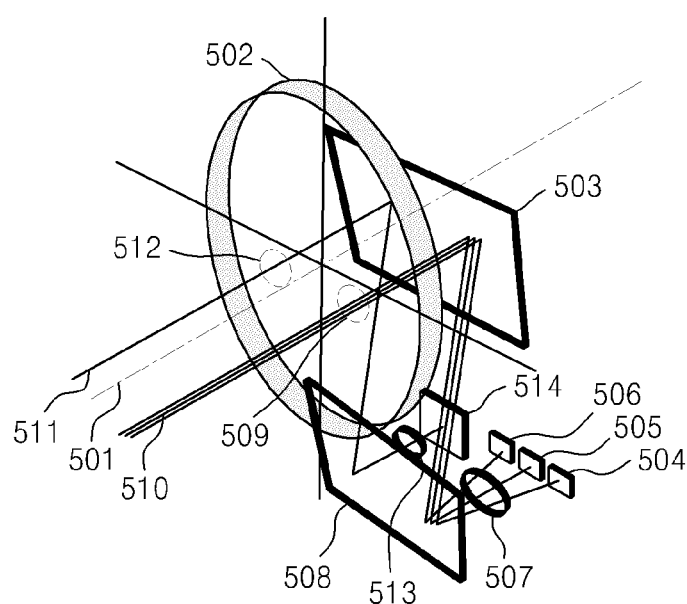
FIGS. 5A through 8 are views of focus detecting apparatuses, according to other embodiments.
Figure 5B:
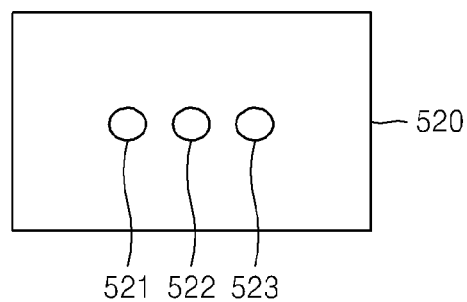

FIGS. 5A and 5B are views of a focus detecting apparatus, according to another embodiment. Hereinafter, only differences between the focus detecting apparatus illustrated in FIGS. 5A and 5B and the focus detecting apparatus illustrated in FIGS. 3A and 4 will be described. For example, reference numerals 501, 502, 508, 509, 511, and 512 respectively correspond to reference numerals 301, 302, 307, 308, 310, and 311 in FIGS. 3A and 4.

In the present embodiment, a plurality of light-transmitting units 504 to 506 are present in order to generate light for AF at multiple points. A light-receiving unit 514 is present as one light-receiving sensor, where in use thereof is divided in time series.

A light-transmitting lens 507 and a light-receiving lens 513 may constitute a reduced optical system, for example, an optical system having a magnification of ⅓. A plane that is equivalent to an image-capturing plane in the image capturing device 304, that is, a plane that is a conjugate plane of the image-capturing plane, is located in an optical path 510 between the light-transmitting lens 507 and an optical film 503.

In the present embodiment, a light-receiving unit 514 receives reflected light that is generated by three light-transmitting units 504 to 506, according to sequential time division sections, so as to detect a position of the reflected light. However, embodiments of the invention are not limited thereto. For example, each of the three light-transmitting units 504 to 506 may generate light having different wavelengths simultaneously and the light-receiving unit 514 may receive reflected light having different wavelengths reflected from the subject simultaneously so as to detect a position of the reflected light.

FIG. 5B illustrates AF detection positions of a viewfinder 520. Reference numerals 521 to 523 correspond to the light-transmitting units 504 to 506, respectively. That is, AF is performed at the positions 521 to 523.

Figure 6A:
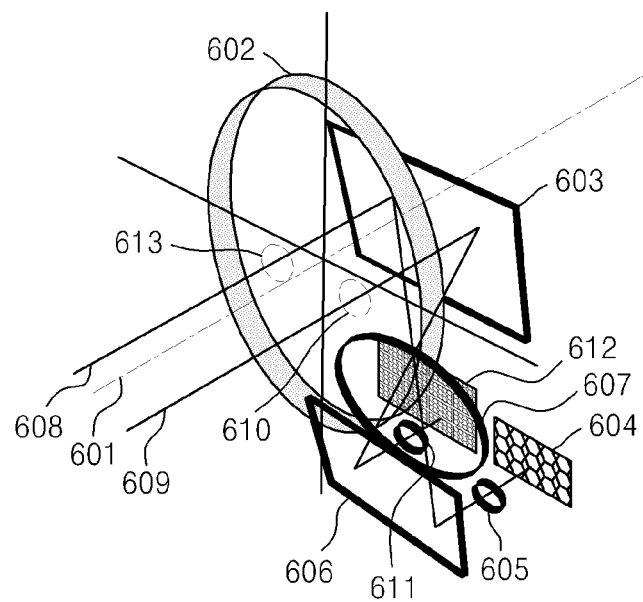
Figure 6B:
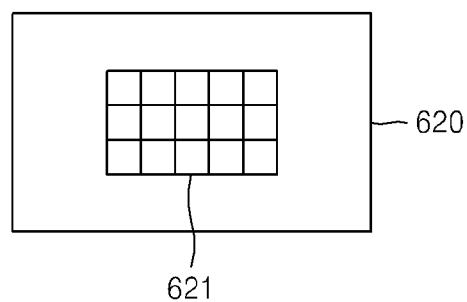

FIGS. 6A and 6B are views of a focus detecting apparatus, according to another embodiment. Hereinafter, only differences between the focus detecting apparatus illustrated in FIGS. 6A and 6B and the focus detecting apparatus illustrated in FIGS. 5A and 5B will be described. For example, reference numerals 601, 602, 603, 606, 610 and 613 respectively correspond to reference numerals 501, 502, 503, 508, 509, and 512 in FIG. 5A.

In the present embodiment, a light-transmitting unit 604 includes 15 LED pellets. That is, 15 lights for AF are generated. In this case, since a range in which light is generated is widened in all directions, a light-transmitting lens 605 and a light-receiving lens 611 constitute a reduced optical system, and a condenser lens 607 is used to define an exit pupil area.

In the present embodiment, a position relationship between the light-transmitting unit 604 and a light-receiving unit 612 and a position relationship between a first exit pupil area 613 and a second exit pupil area 610 are opposite to each other. Thus, the condenser lens 607 is configured such that a light-transmitting path 608 and a light-receiving path 609 cross each other. A plane where the light-transmitting path 608 and the light-receiving path 609 cross each other is a plane that is a conjugate plane of an image capturing sensor. That is, a focus-detecting optical system is a re-imaging system. The focus-detecting optical system determines limitations in F-values of beams of light for AF.

A magnification of the reduced optical system is determined by a combination of the condenser lens 607 and the light-transmitting lens 605 and a combination of the condenser lens 607 and the light-receiving lens 611. For example, the magnification is set to ⅕.

In addition, in the present embodiment, since 15 lights for AF are generated, an area sensor is used as the light-receiving unit 612. The light-receiving unit 612 receives reflected lights that are generated by the light-transmitting unit 604 according to a predetermined time difference and detects a position of each reflected light.

FIG. 6B, like FIG. 5B, illustrates AF detection positions 621 that correspond to the 15 LED pellets of the light-transmitting unit 604 of a viewfinder 620.

Figure 7:
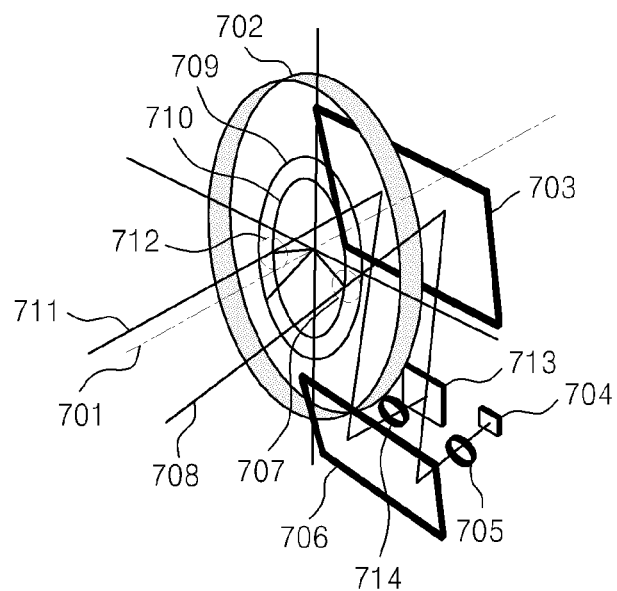

FIG. 7 is a view of a focus detecting apparatus, according to another embodiment. The focus detecting apparatus includes an image capturing lens 702, an optical film 703, a light-transmitting unit 704, a light-receiving unit 713, a reflection mirror 706, a light-transmitting lens 705, and a light-receiving lens 714. Reference numeral 701 denotes an optical axis of the image capturing lens 702. In the present embodiment, a beam of transmitted light 708 in a first exit pupil area 707 and a beam of received light 711 in a second exit pupil area 712 are limited to particular F-values.

In the present embodiment, both the beam of transmitted light and the beam of received light are F7.0. A center of the beams of light is F11, an outer circumference thereof is F7.0, and an inner circumference thereof is F22. In FIG. 7, reference numeral 709 represents an F7.0 area that corresponds to a bright side in the range of the beam of transmitted light and the beam of reflected light. Reference numeral 710 represents an F11 area, that is, the center of the beam of transmitted light and the beam of received light.

A beam of light irradiated onto a bright side of the first exit pupil area 707 is F7.0, a beam of light irradiated onto a center of the first exit pupil area 707 is F11, and a beam of light irradiated onto a dark side of the first exit pupil area 707 is F22. A beam of light irradiated onto the dark side of the first exit pupil area 707 may not be limited; however, a beam of reflected light over a desired distance may be limited, for example, to F22.

A beam of light of the second exit pupil area 712 may be limited to a particular F-value, like with the first exit pupil area 710.

Figure 8:
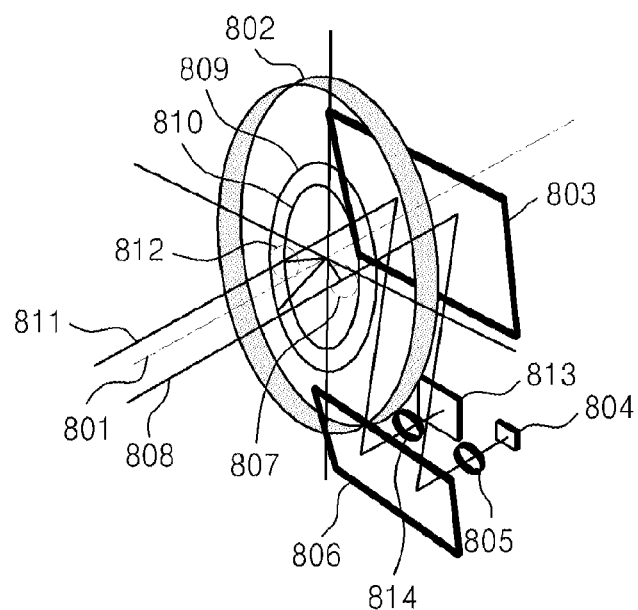

FIG. 8 is a view of a focus detecting apparatus, according to another embodiment. Hereinafter, only differences between the focus detecting apparatus illustrated in FIG. 8 and the focus detecting apparatus illustrated in FIG. 7 will be described. For example, reference numerals 803, 806, 804, 813, 805, and 814 respectively correspond to reference numerals 703, 706, 704, 713, 705 and 714 in FIG. 7.

In the present embodiment, a light-transmitting system on an optical axis 801 of an image capturing lens 802, and a beam of light irradiated outside of the light-transmitting system is F11. A light-receiving unit thereof is as illustrated in FIG. 7. F-values according to which a first exit pupil area 807 and a second exit pupil area 812 are limited and are different from each other; however, a position deviation quantity and a focus deviation quantity of a light-transmitting unit illustrated in FIG. 24, which will be described below, is calculated based on the F-values.

Reference numeral 809 represents an F7.0 area that corresponds to a bright side in the range of a beam of reflected light. Reference numeral 810 represents an F11 area, that is, a center of the beam of reflected light.

A beam of light irradiated onto a bright side of the first exit pupil area 807 is F11, a beam of light 808 irradiated onto a center of the first exit pupil area 807 is F22, and a beam of light irradiated onto a dark side of the first exit pupil area 807 is F40.

A beam of light irradiated onto a bright side of the second exit pupil area 812 is F7.0, a beam of light 811 irradiated onto a center of the second exit pupil area 812 is F11, and a beam of light irradiated onto a dark side of the second exit pupil area 812 is F22.

Figure 9:
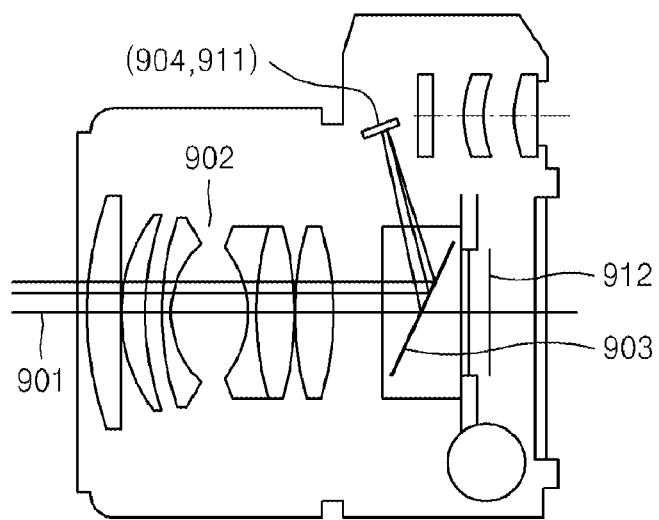
FIG. 9 is a view of a structure of a digital photographing apparatus, according to another embodiment.
Figure 10:
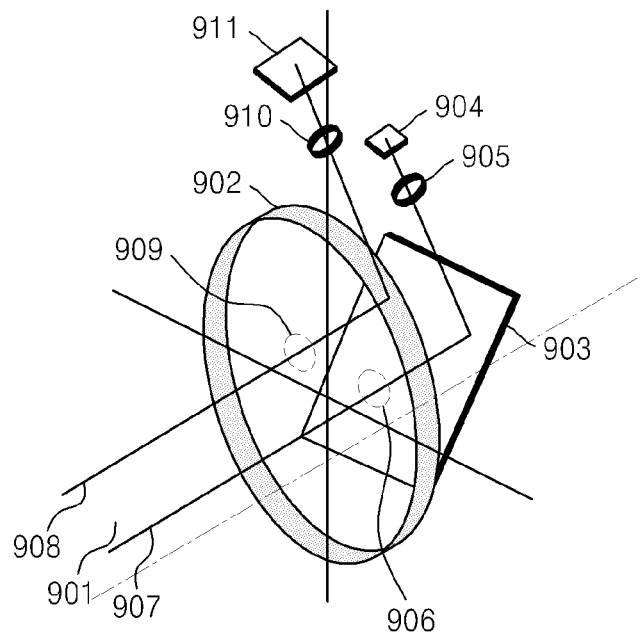
FIG. 10 is a view of a focus detecting apparatus of the digital photographing apparatus illustrated in FIG. 9, according to another embodiment.

FIG. 9 is a view of a structure of a digital photographing apparatus, according to another embodiment. FIG. 10 is a view of a focus detecting apparatus of the digital photographing apparatus illustrated in FIG. 9. The digital photographing apparatus includes an image capturing lens 902, an optical film 903, an image capturing device 912, a light-transmitting unit 904, a light-receiving unit 911, a light-transmitting lens 905, and a light-receiving lens 910.

As a difference between the focus detecting apparatus of FIG. 9 and the focus detecting apparatus of FIG. 7, optical paths 907 and 908 for emitted light and incidence light pass through a region above an optical axis 901. That is, both a first exit pupil area 906 and a second exit pupil area 909 are in an upper semicircular region of an image capturing lens 902.

Figure 11:
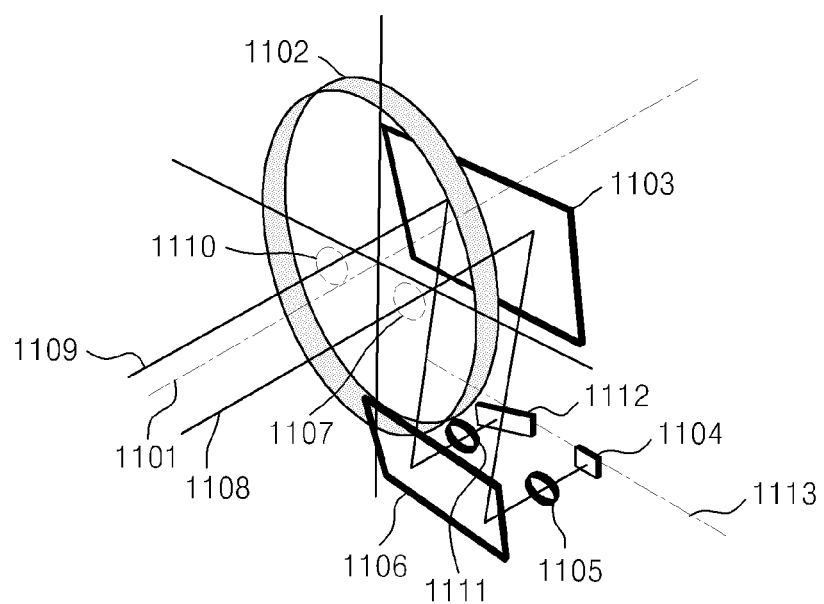
FIGS. 11 through 13 are views of focus detecting apparatuses, according to other embodiments.

FIG. 11 is a view of focus detecting apparatuses, according to another embodiment. Hereinafter, only differences between the focus detecting apparatus illustrated in FIG. 11 and the focus detecting apparatus illustrated in FIG. 4 will be described. For example, reference numerals 1102, 1103, 1106, 1104, 1105, 1111, 1108, and 1109 respectively correspond to reference numerals 302, 303, 307, 304, 306, 312, 309, and 310 in FIG. 4.

Referring to FIG. 11, a light-receiving unit 1112 uses a line sensor as a light-receiving sensor. The line sensor is installed to be inclined toward a movement direction of reflected light. Reference numeral 1113 denotes a guide line for indicating a position relationship of the line sensor between a first exit pupil area 1107 and a second exit pupil area 1110.

The line sensor is inclined at a predetermined angle, as shown in FIG. 11.

In this case, a gradient of the line sensor is substantially the same as that of a line that connects an optical axis 1101 and a center of the second exit pupil area 1110. In case of an in-focused state, an image that is generated by light received by the light-receiving unit 1112 is moved along a direction in which the line sensor is inclined.

Figure 12:
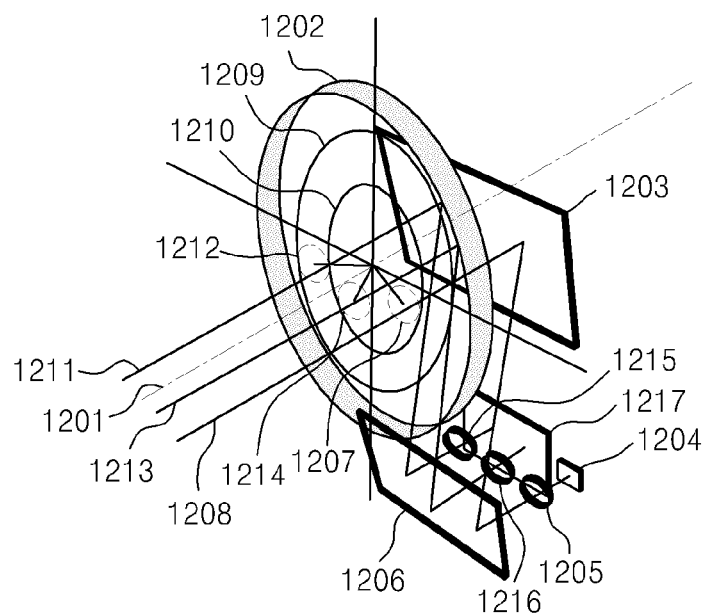

FIG. 12 is a view of focus detecting apparatuses, according to another embodiment. The focus detecting apparatus includes an optical film 1203, a light-transmitting unit 1204, a light-transmitting lens 1205, light-receiving lenses 1215 and 1216, and a reflection mirror 1206. Reference numeral 1201 denotes an optical axis of the image capturing lens 1202. Hereinafter, only differences between the focus detecting apparatus illustrated in FIG. 12 and the focus detecting apparatus illustrated in FIG. 8 will be described.

Referring to FIG. 12, in the present embodiment, a light-transmitting system for F7.0, a light-receiving system for F2.8, and a light-receiving system for F7.0 are used. That is, the light-transmitting system uses one optical path as a common optical path, but includes a plurality of light beam-limiting lenses. However, a light-receiving unit 1217 uses one light-receiving sensor as a common light-receiving sensor in a plurality of light-receiving systems.

When an image capturing lens 1202 is brighter than F2.8, a depth of a subject is shallow. As AF precision increases, a focal position is detected using a result of detecting a light beam region. On the other hand, when the image capturing lens 1202 is darker than F2.8, the focal position is detected using a result of detecting an F7.0 light beam region.

Reference numeral 1209 denotes an F2.8 region in which a beam of reflected light is considered bright. Reference numeral 1210 denotes an F7.0 region in which transmitted light and the reflected light are considered bright.

A beam of light irradiated onto a bright side of a first exit pupil area 1207 is F7.0, a beam of light 1208 irradiated onto a center of the first exit pupil area 1207 is F11, and a beam of light irradiated onto a dark side of the first exit pupil area 1207 is F22.

A beam of light irradiated onto a bright side of a second exit pupil area 1212 is F2.8, a beam of light 1211 irradiated onto a center of the second exit pupil area 1212 is F4.0, and a beam of light irradiated onto a dark side of the second exit pupil area 1212 is F7.0.

A beam of light irradiated onto a bright side of a third exit pupil area 1214 is F7.0, a beam of light 1213 irradiated onto a center of the third exit pupil area 1214 is F11, and a beam of light irradiated onto a dark side of the third exit pupil area 1214 is F22, like with respect to the first exit pupil area 1207.

As described above, when an F-value of the image capturing lens 1202 is F2.8, a focal position is detected using reflected light 1211 that passes through the second exit pupil area 1212. On the other hand, when the image capturing lens 1202 is darker than F2.8, the focal position is detected using reflected light 1213 that passes through the third exit pupil area 1214.

Figure 13:
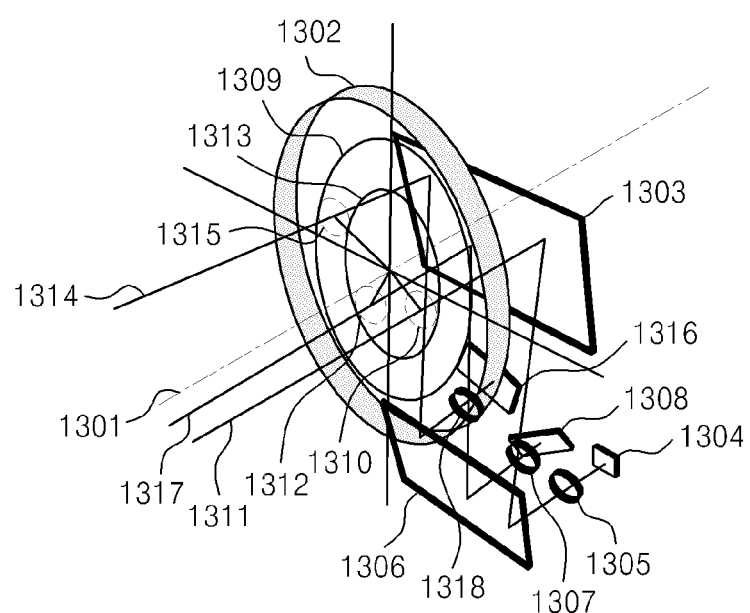

FIG. 13 is a view of focus detecting apparatuses, according to another embodiment. Hereinafter, only differences between the focus detecting apparatus illustrated in FIG. 13 and the focus detecting apparatus illustrated in FIG. 12 will be described. For example, reference numerals 1301, 1303, 1304, 1305, 1306, 1309, 1313, 1310, and 1311 respectively correspond to reference numerals 1201, 1203, 1204, 1205, 1206, 1209, 1210, 1207, and 1208 in FIG. 12.

Referring to FIG. 13, light-receiving units 1316 and 1308 include a first line sensor 1316 and a second line sensor 1308. A first light-receiving lens 1318 and a second light-receiving lens 1307 are disposed to correspond to the first line sensor 1316 and the second line sensor 1308, respectively.

In this case, a second exit pupil area 1315 and a third exit pupil area 1312 are in upper and lower portions of an image capturing lens 1302, respectively. Thus, an image formed by reflected light that follows a first reflection optical path 1314 and an image formed by reflected light that follows a second reflection optical path 1317 move in opposite directions based on their focal positions. Thus, the first line sensor 1316 and the second line sensor 1308 are installed to be inclined in opposite directions. In this case, gradients at which the first line sensor 1316 and the second line sensor 1308 are installed, may be determined, as described with reference to FIG. 11.

FIGS. 14A through 14F are views illustrating operations of designing holographic optical elements (HOEs).

Figure 14A:
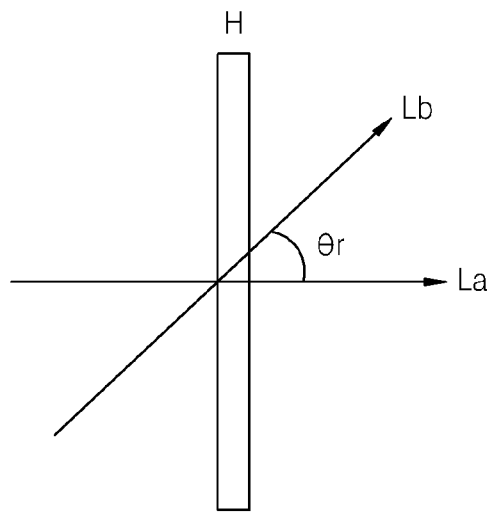
FIGS. 14A through 14F are views illustrating operations of designing holographic optical elements (HOEs)

FIG. 14A illustrates a time when a HOE is manufactured. In FIG. 14A, object light La is incident on a photosensitive body H, and simultaneously, reference light Lb is incident on the photosensitive body H by angle θr. In this case, wavelengths of the object light La and the reference light Lb are all λ0. Diffraction patterns are formed on the photosensitive body H based on two beams of the object light La and the reference light Lb due to interference.

Hereinafter, characteristics of HOEs according to other embodiments will be described in more detail.

Figure 14B:
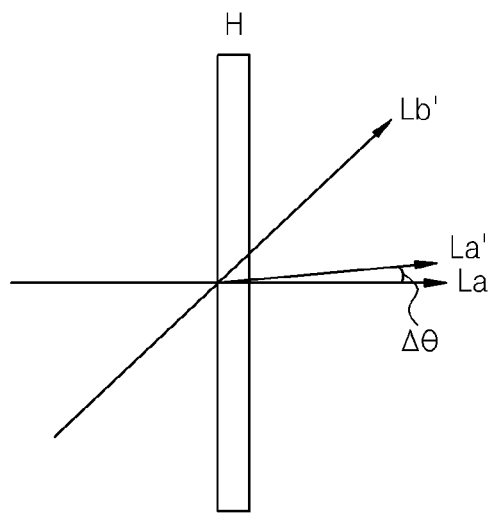

FIG. 14B illustrates a use state of the manufactured HOE. When reproduction reference light Lb' is incident on the photosensitive body H of the HOE, reproduction light La' is reproduced. When a wavelength of the reproduction reference light Lb' is the same as that of the reference light Lb used in manufacturing the HOE, the reproduction light La' is reproduced in the same direction as that of the object light La.

In this case, when the wavelength of the reproduction reference light Lb' is λc, the reproduction light is reproduced as La', and an angle that is different from La by λθ, is formed. Thus, the reference light Lb used in manufacturing the HOE and the reproduction reference light Lb' may be designed to have the same wavelength.

Although only water waves have been described, the object light La may be set to be a spherical wave, and accordingly, the HOE may have power. This may be a design choice, and installation of lenses may be omitted. For example, the condenser lens 607 may be omitted when the HOE used in FIG. 6 has power.

Figure 14C:
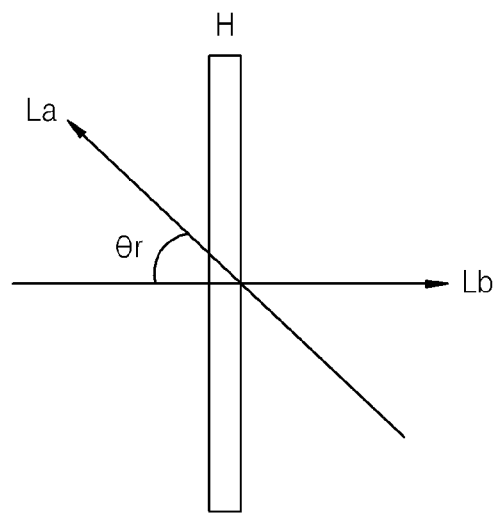

FIG. 14C illustrates a time when a reflection type HOE is manufactured. In FIG. 14C, object light La is incident on a photosensitive body H by θr, and simultaneously reference light Lb is incident on the photosensitive body H. Here, wavelengths of all lights are $v_0$. Reflection type diffraction patterns are formed on the photosensitive body H according to two beams of the object light La and the reference light Lb due to interference.

Figure 14D:
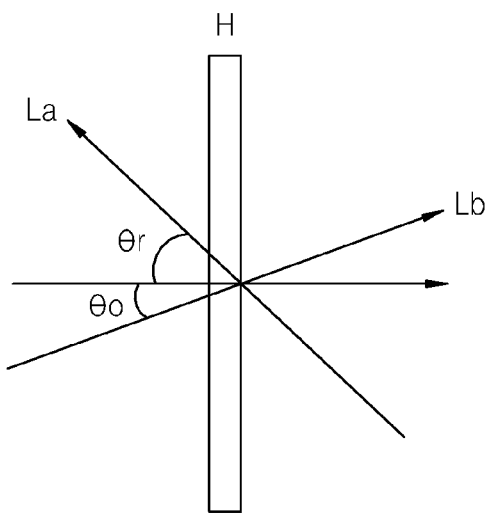

In addition, FIG. 14D illustrates a time when a reflection type HOE is manufactured. In FIG. 14D, object light La is incident on a photosensitive body H at an angle of $θ_r$, and simultaneously reference light Lb is incident on the photosensitive body H at an angle of $θ_o$. Here, wavelengths of all lights are $λ_0$. Reflection type diffraction patterns are formed on the photosensitive body H according to two beams of the object light La and the reference light Lb due to interference.

Figure 14E:
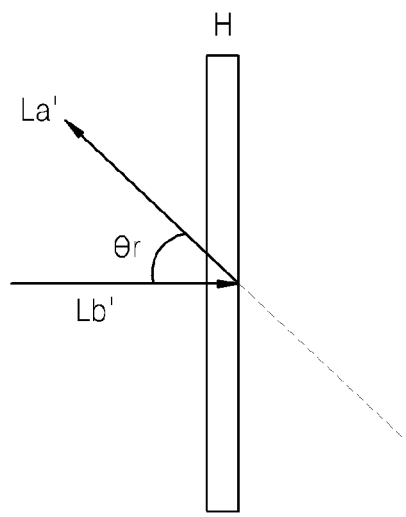

FIG. 14E illustrates a case in which the manufactured reflection type HOE is used. In FIG. 14E, when reproduction reference light Lb' is incident on the photosensitive body H, reflected reproduction light La' is reproduced. When a wavelength of the reproduction reference light Lb' is the same as that of the reference light Lb used in manufacturing the HOE, the reflected reproduction light La' is reproduced in the same direction as that of the object light La.

Figure 14F:
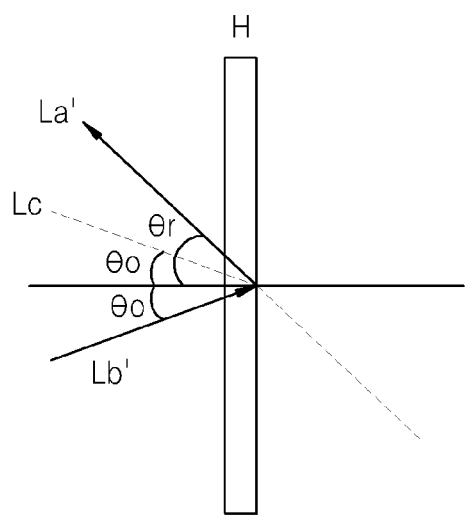

FIG. 14F illustrates a case in which the manufactured reflection type HOE is used. In FIG. 14F, when reproduction reference light Lb' is incident on the photosensitive body H at an angle of $θ_o$, in a case of a general mirror, reflected light Lc is reproduced at the angle of $θ_o$. However, reflected reproduction light La' is reproduced at an angle of $θ_r$. When a wavelength of the reproduction reference light Lb' is the same as that of the reference light Lb used in manufacturing the HOE, the reproduction light is reproduced in the same direction as that of the object light La.

An optical structure using the characteristics of HOEs is a non-specular reflection optical structure and may be used in FIG. 2A through 2D.

Figure 15:
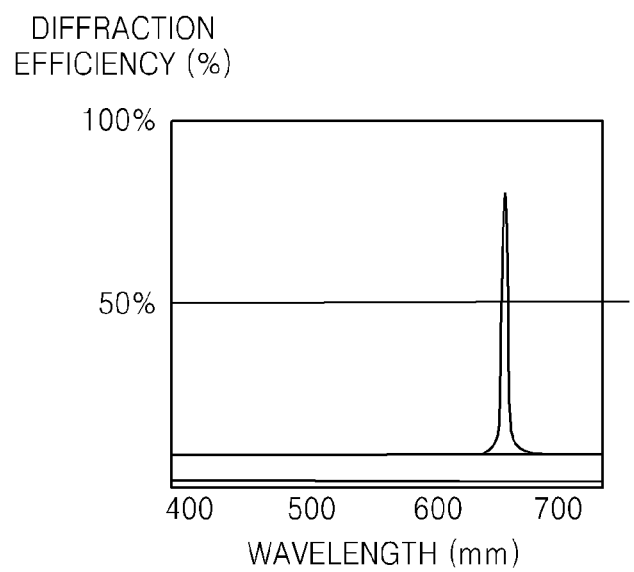
FIG. 15 is a view of wavelength selectivity of an HOE.

FIG. 15 is a view of wavelength selectivity of an HOE, as illustrated in FIG. 3B. The horizontal axis of FIG. 15 represents wavelength, and the vertical axis represents diffraction efficiency.

The HOE has wavelength selectivity. That is, the HOE has optical characteristics that respond to only a particular wavelength. When diffraction patterns for a wavelength that is different from that of FIG. 3B, for example, 650 nm, are formed, the HOE may be designed to reflect only light having the wavelength of 650 nm. Light having another wavelength may be transmitted. In addition, another wavelength may be used.

In this case, the HOE may be designed to have a diffraction efficiency of about 97%. A wavelength half value width may be set to 10 nm.

By using the above-described characteristics, only wavelengths of beams of transmitted light and received light that are used for AF may be reflected, and the other wavelengths may be transmitted. For example, the optical film 303 of FIG. 3 may be a configuration that corresponds to the above description.

Hereinafter, various embodiments of light-receiving units will be described.

Figure 16:
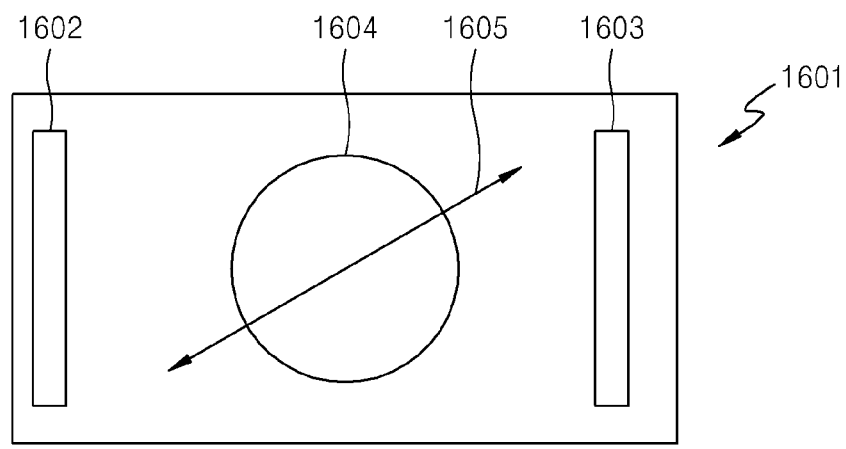
FIG. 16 is a view of a light-receiving unit, according to an embodiment.

FIG. 16 is a view of a light-receiving unit, according to an embodiment.

Referring to FIG. 16, the light-receiving unit uses a PSD sensor 1601 as a light-receiving sensor. Reflected light is moved along a diagonal direction 1605.

Electrodes 1602 and 1603 are formed on ends of the PSD sensor 1601. Since an image 1604 formed by the reflected light is moved along the diagonal direction 1605, a horizontal position of a center of the reflected light is detected. A focus deviation quantity may be calculated using information regarding the detected position.

Figure 17:
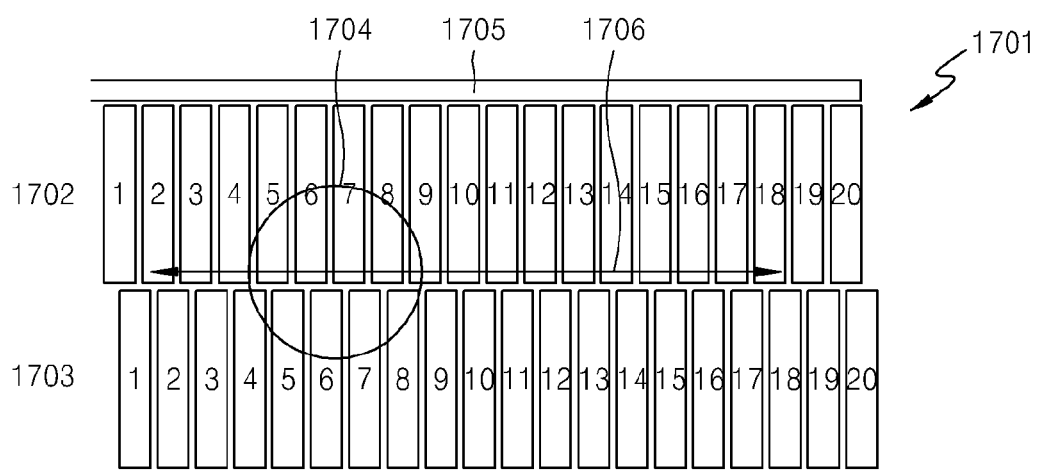
FIGS. 17 and 18 are views of light-receiving units, according to other embodiments.

FIG. 17 is a view of a light-receiving unit, according to another embodiment.

Referring to FIG. 17, the light-receiving unit uses a charge-coupled device (CCD) line sensor 1701 as a light-receiving sensor. The CCD line sensor 1701 may include a first line sensor 1702 and a second line sensor 1703 that are disposed in a zigzag manner.

The light-receiving unit includes a brightness monitor 1705. The brightness monitor 1705 determines an integral time of the CCD line sensor 1701.

The CCD line sensor 1701 is installed to have a gradient by which an image 1704 formed by reflected light moves along a line sensor direction 1706.

Figure 18:
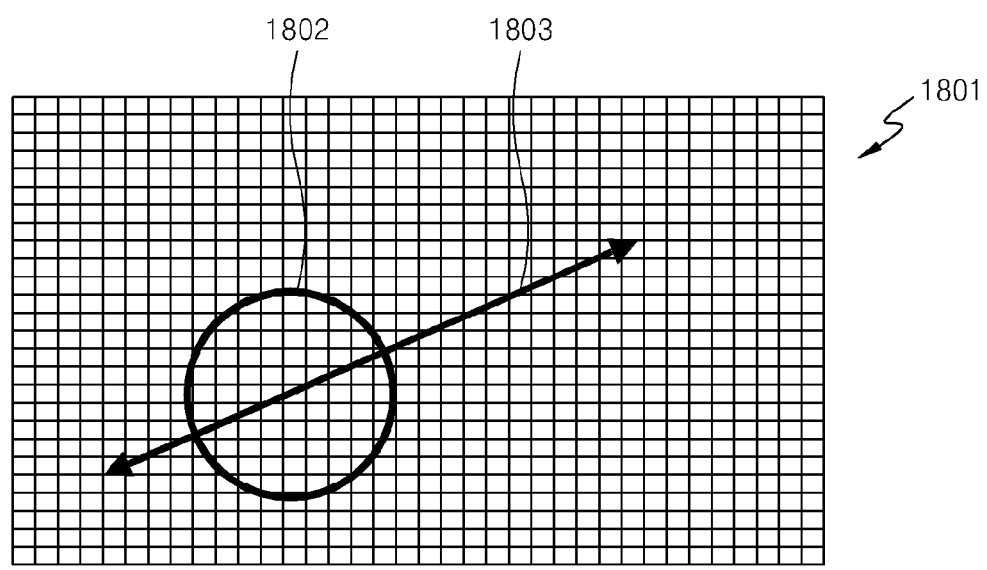

FIG. 18 is a view of a light-receiving unit, according to another embodiment.

Referring to FIG. 18, the light-receiving unit uses an area sensor 1801 as a light-receiving sensor. Reflected light is moved along a diagonal direction 1803.

When a plurality of light-transmitting elements is used, a plurality of images 1802 is formed by the reflected light. The area sensor 1801 may detect a plurality of reflected lights with a time difference and may define a central position of each of the plurality of reflected lights. When one light-transmitting element is used, the area sensor 1801 may be installed to be inclined, as the line sensor, so as to be parallel to the movement direction of the plurality of images 1802 formed by the reflected light.

Figure 19:
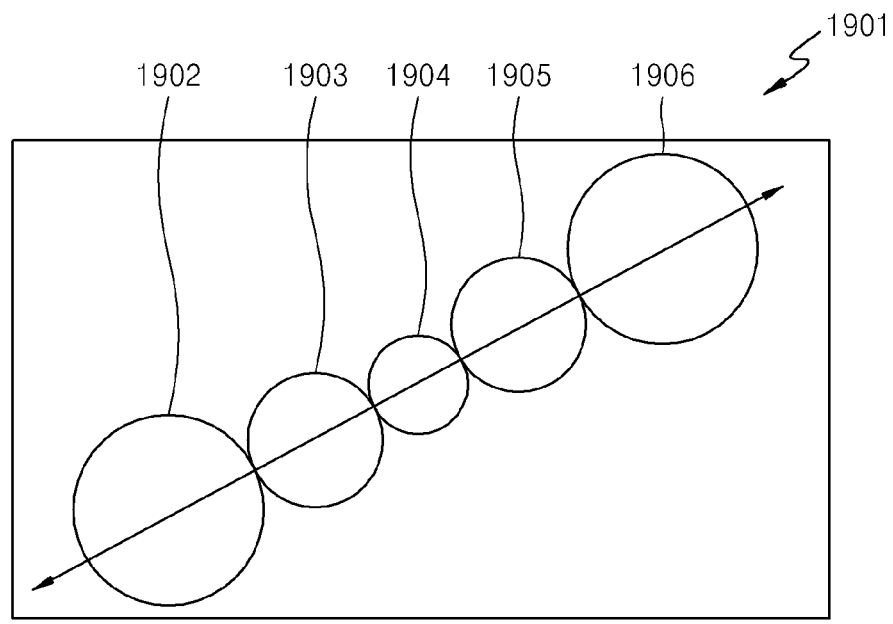
FIG. 19 is a view of movement of an image formed by reflected light on the light-receiving units illustrated in FIGS. 17 and 18.

FIG. 19 is a view of movement of an image formed by reflected light on the light-receiving units illustrated in FIGS. 17 and 18.

Referring to FIG. 19, the image formed by the reflected light is moved along a diagonal direction, and as the image gets further away from a focal position, i.e., as the image becomes less focused, the size of the image increases.

In various focus detecting apparatuses according to the one or more embodiments, a beam of light used in phase difference AF is not coincident with a horizontal line including an optical axis of an image capturing lens, so as to use an upper or lower exit pupil area of the image capturing lens.

Thus, when the image formed by the reflected light is not properly focused on, the image formed by the reflected light is moved along the diagonal direction. When the image is in an in-focused state, reflected light 1904 that is in focus is received by a light-receiving sensor 1901. When focus is in front of or behind a focal point at which the image formed by the reflected light is in focus, the size of a received image increases gradually from that of the in-focused state, as illustrated in FIG. 19. Reference numerals 1902 and 1903 denote cases in which focus is in front of the focal point at which the image formed by the reflected light is in focus, and reference numerals 1905 and 1906 denote cases in which focus is behind the focal point at which the image formed by the reflected light is in focus.

Figure 20:
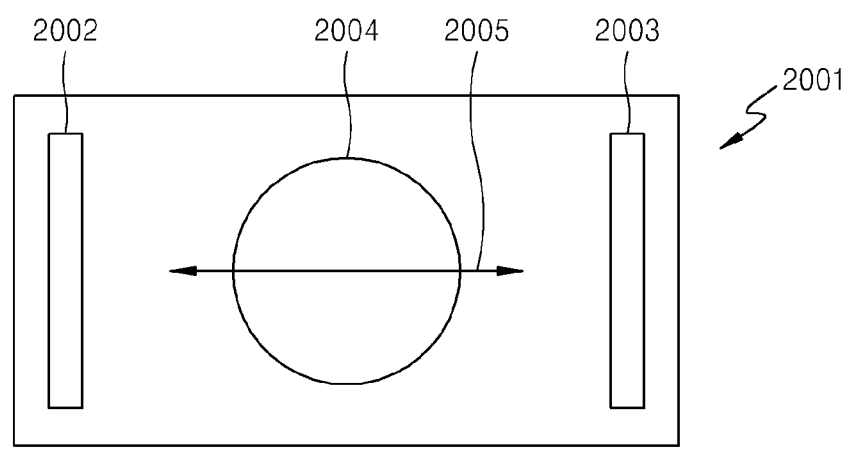
FIG. 20 is a view of movement of an image formed by reflected light on a light-receiving unit of a focus detecting apparatus, according to the related art.

FIG. 20 is a view of movement of an image formed by reflected light on a light-receiving unit of a focus detecting apparatus according to the related art that is used in active AF according to the related art.

Referring to FIG. 20, a PSD sensor 2001 includes electrodes 2002 and 2003. Reflected light 2004 is received on a surface of the PSD sensor 2001. In this case, an image formed by the reflected light 2004 is moved along a direction 2005, that is, a direction along a line that connects a light-transmitting unit and a light-receiving unit. The size of the image varies according to a distance between the image and a subject.

Hereinafter, a principle of TTL active AF will be briefly described.

Figure 21A:
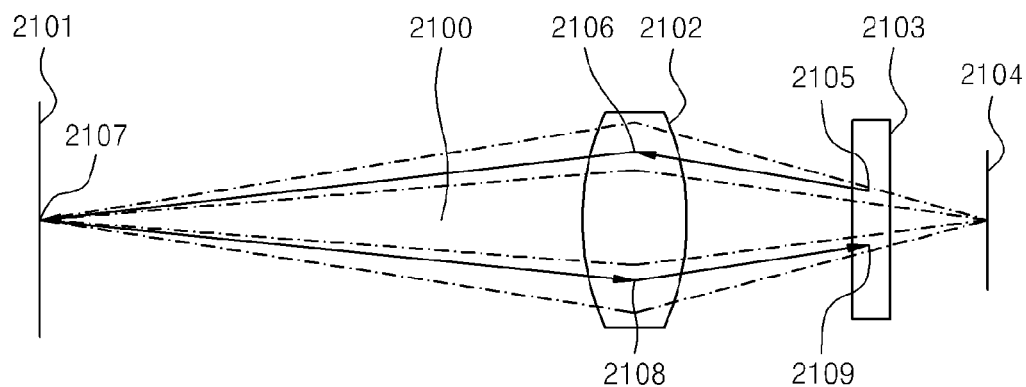
FIGS. 21A through 23B are views illustrating in-focused states obtained using a through the lens (TTL) active auto-focusing (AF) method.
Figure 21B:
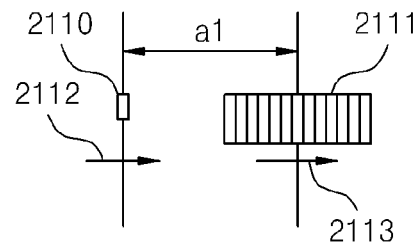

FIGS. 21A and 21B are views illustrating in-focused states.

Figure 22A:
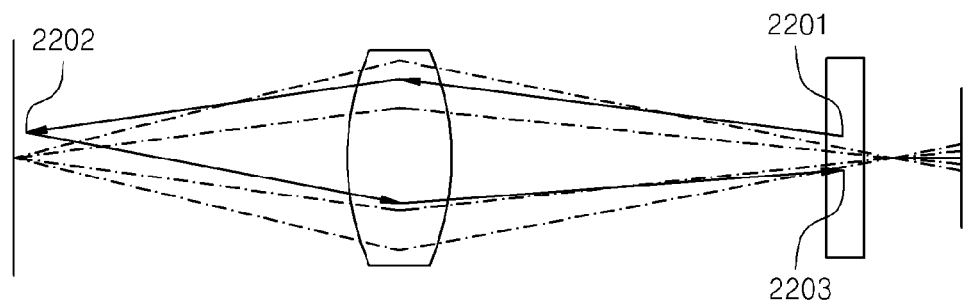
Figure 23A:
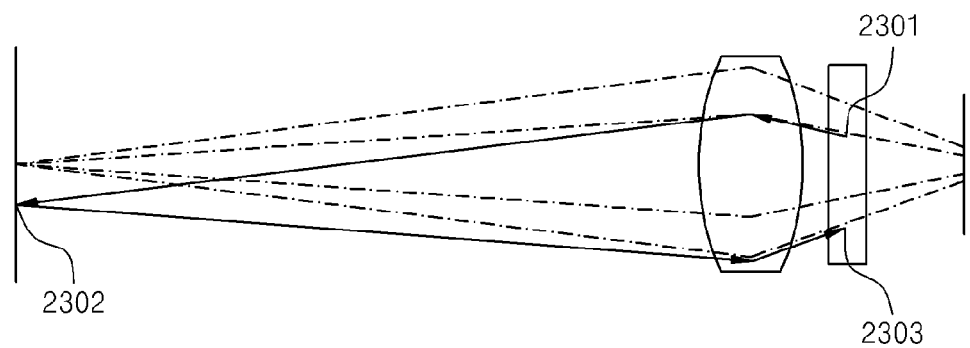

Referring to FIGS. 21A, 22A, and 23A, each configuration of the drawings includes an optical axis 2100 of an image capturing lens 2102, a subject 2101, the image capturing lens 2102, a mirror 2103, an image capturing device 2104, a position 2105 of transmitted light on the mirror 2103, an exit pupil area 2106 through which a beam of transmitted light passes, a position 2107 of the subject 2101 on which light from light-transmitting light source is projected, an exit pupil area 2108 through which a beam of reflected light passes, and a position 2109 of received light on the mirror 2103.

FIG. 21B illustrates a state of an image on a plane that is a conjugate plane of an image-capturing plane of the image capturing device 2104 in the state of FIG. 21A. Reference numeral 2110 denotes the light-transmitting light source, and reference numeral 2111 denotes a light-receiving sensor.

For easy understanding, the light-transmitting light source 2110 may be expressed as an arrow. That is, reference numeral 2112 denotes an image formed by the light-transmitting light source, and reference numeral 2113 denotes an image formed on the light-receiving sensor. A distance between the image 2112 and the image 2113 is a1.

Figure 22B:
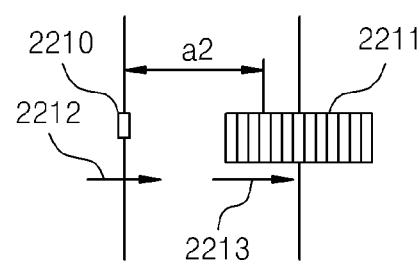

FIGS. 22A and 22B illustrate forward-focused states.

Referring to FIG. 22A, in a forward-focused state, a position 2201 of transmitted light is the same as that of an in-focused state. However, a position 2202 of a subject on which light of a light-transmitting light source is projected is different from that of the in-focused state.

In addition, an exit pupil area through which a beam of reflected light passes, is the same as that of the in-focused state. However, a position 2203 of received light is a position that is different from that of the in-focused state.

Referring to FIG. 22B, a position of a light-transmitting light source 2210 is the same as that of FIG. 21B; however, a position of an image 2213 formed on a light-receiving sensor 2211 has been changed. A distance between an image 2212 formed by the light-transmitting light source 2210 and the image 2213 formed by the light-receiving sensor 2211 is a2, which is smaller than a1.

Figure 23B:
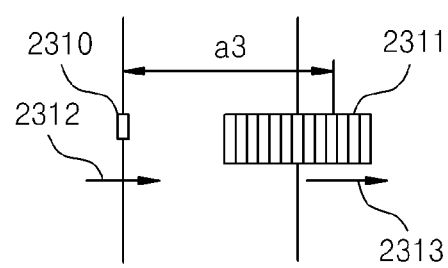

FIGS. 23A and 23B illustrate backward-focused states.

Referring to FIG. 23A, in a backward-focused state, a position 2301 transmitted light is the same as that of the in-focused state. However, a position of a subject 2302 on which light of a light-transmitting light source is projected is different from that of the in-focused state.

In addition, an exit pupil area through which a beam of reflected light passes, is the same as that of the in-focused state. However, a position 2303 of received light is different from that of the in-focused state.

Referring to FIG. 23B, a position of a light-transmitting light source 2310 is the same as that of FIG. 21B; however, a position of an image 2313 formed on a light-receiving sensor 2311 has been changed. A distance between an image 2312 formed by the light-transmitting light source 2310 and the image 2313 formed by the light-receiving sensor 2311 is a3, which is larger than a1.

That is, as described above, in the TTL active AF method, focus not coincident in a direction of an optical axis is transformed into movement of an image in a direction perpendicular to the optical axis by dividing an exit pupil area, so that a focal position is detected.

Figure 24:
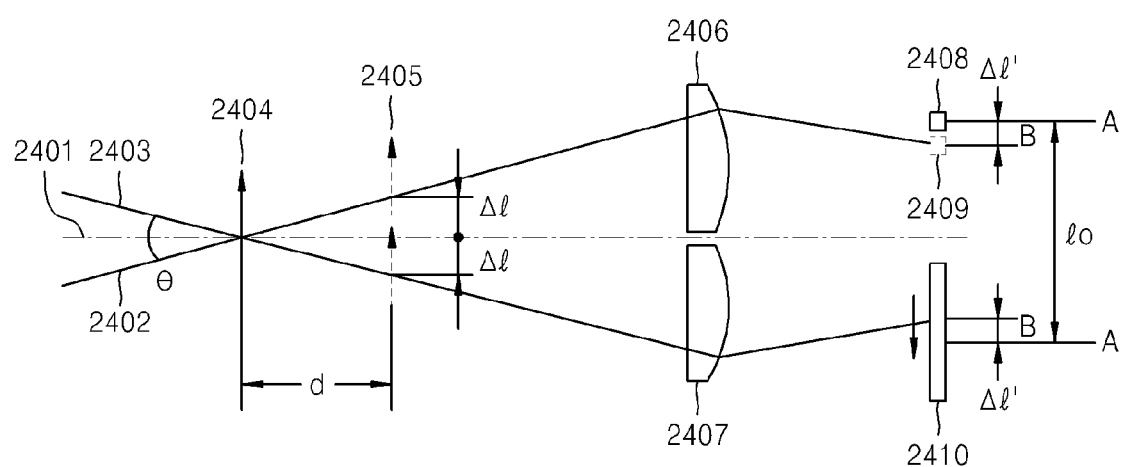
FIG. 24 is a view illustrating an operation of calculating a focus deviation quantity.

FIG. 24 is a view illustrating an operation of calculating a focus deviation quantity.

Referring to FIG. 24, a configuration of the drawing includes an optical axis 2401 of an image capturing lens, main light 2402 of a beam of transmitted light for AF, main light 2403 of a beam of received light for AF, an image plane 2404 in a case of a forward-focused state, a plane 2405 that is a conjugate plane of an image capturing plane in an in-focused state, a light-transmitting lens 2406, a light-receiving lens 2407, a light-transmitting light source 2408, a visual light-transmitting light source position 2409 in a case of the forward-focused state, and a light-receiving sensor 2410. lo indicates a distance between images in the in-focused state, and Δl' indicates a quantity of movement of an image in the forward-focused state. That is, A indicates a position of an image in the in-focused state, and B indicates a position of an image in the forward-focused state.

Light is transmitted at the position A (upper portion) in which a light-transmitting light source 2408 is disposed, and an image is formed at the position A (lower portion) of the light-receiving sensor 2410 in the in-focused state.

However, in the forward-focused state, the light-transmitting light source 2408 is actually located at the position A (upper portion); however, it is observed on a conjugate plane of an image capturing plane that the light-transmitting light source 2408 is located at the position B. Thus, a difference d between the conjugate plane 2405 of the image capturing plane of the in-focused state and the image plane 2404 in the forward-focused state is a defocus quantity, that is, a focus deviation quantity.

When observed in a direction perpendicular to the optical axis 2401, a distance between images in the in-focused state is lo, and in the forward-focused state, a position of the image is moved by Δl'-Δl'. That is, a quantity of a variation in distance between images is a function of the defocus quantity. Thus, the defocus quantity d may be expressed as a variation in distance between images by using Equation 1.

$$d = \frac{\Delta l}{\tan\theta} = \frac{\Delta l'}{\beta\tan\theta}$$ [Equation 1]

β: reduced magnification, Δl'=Δl'+Δl'

In Equation 1, the defocus quantity may be calculated by obtaining Δl'+Δ.

Hereinafter, an AF operation of a digital photographing apparatus will be described with reference to timing diagrams.

Figure 25:
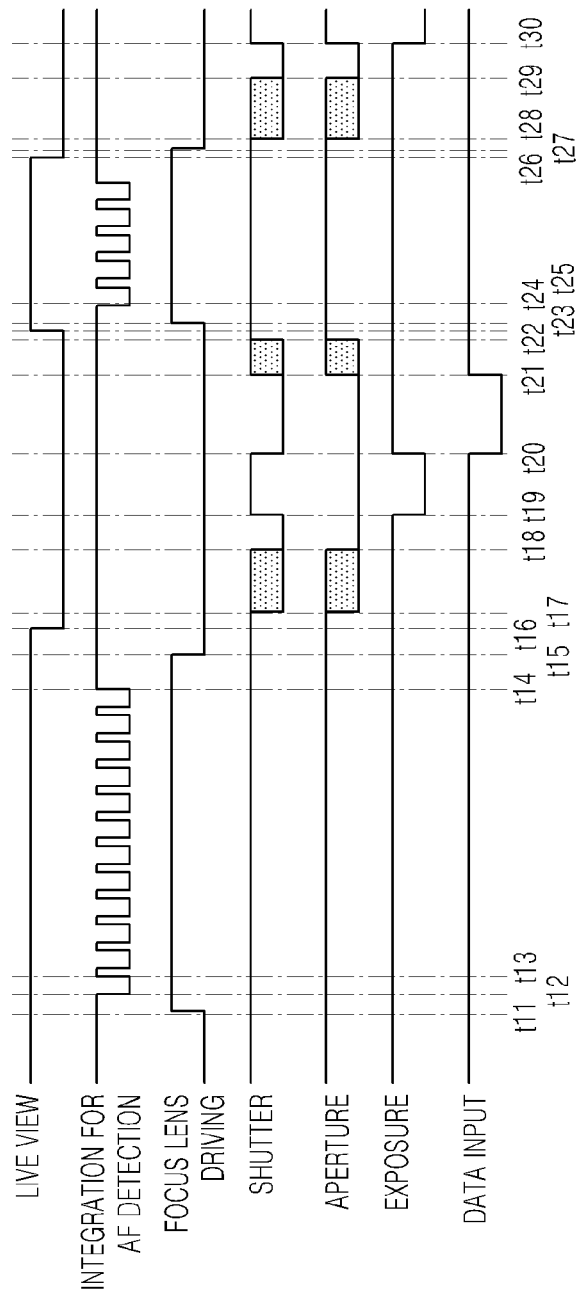
FIG. 25 is a timing diagram of an example in which contrast AF is performed by a focus detecting apparatus, according to the related art.

FIG. 25 is a timing diagram of an example in which contrast AF is performed by a focus detecting apparatus according to the related art. From the top, live view, integration for AF detection, focus lens driving, shutter, aperture, exposure, and data input are present. FIG. 25 illustrates a continuous shooting operation of continuously capturing a still image; however, when only one image is captured, the image capturing operation is the same as first photographing of the continuous shooting operation.

First, a release button is half-pressed, and an AF operation starts being performed. By half pressing the release button, a focus lens starts being driven (t11). Subsequently, an image capturing device starts integration for AF so as to perform focus detection (t12). In this case, the integration operation is performed in synchronization with a vertical synchronous signal VD of the image capturing device.

One integration operation for AF is completed (t13), and the whole integration operation for AF is completed by repeatedly performing the integration operation (t14). For example, when the digital photographing apparatus operates at a speed of 120 fps, time required for one integration operation is 8.3 ms.

A peak value of contrast values is obtained for a time period between t13 and t14, and the focus lens is driven to the obtained peak position. A detailed description thereof is omitted; however, a reciprocating motion operation for peak detection and back rush correction may be repeatedly performed.

If the position of the peak value is detected at t14, integration for AF is terminated, and the image capturing device performs an image capturing operation continuously while detecting the position of the peak value so as to display a live view image.

If the position of the peak value of the contrast values is detected, the focus lens is driven to the peak position, and if the focus lens reaches the peak position, driving of the focus lens is terminated (t15). Subsequently, display of the live view image is terminated (t16).

After display of the live view image is terminated, driving of a shutter and an aperture starts being performed so as to make the shutter enter a closed state and to adjust the aperture to an appropriate aperture value (t17~t18). If a preparation for image capturing is terminated, the shutter is opened, and the image capturing device is exposed for a predetermined exposure time (t19~t20). After exposure is terminated, image data regarding a subject is read (t20~t21).

If reading of the image data is terminated, the shutter and the aperture are in an open state (t21~t22). Display of the live view image restarts (t23), and from t24, a new AF operation starts.

In a contrast AF method, an operation of detecting contrast by performing AF driving needs to be repeatedly performed so as to detect a peak position (e.g., t26~t30). Thus, a predetermined time is required for detecting the peak position. Since it takes time to perform AF in continuous shooting, it is not possible to increase the number of continuous shooting operations when performing AF. In addition, prediction AF of a moving object is not easy.

In TTL active AF, if not in bad conditions, a focal position may be detected using an initial detecting operation during AF driving. That is, an in-focused state may be established by one detecting operation. Thus, AF may be performed at high speed, and the number of continuous shooting operations may be increased, and moving object prediction AF may also be easily performed.

Figure 26:
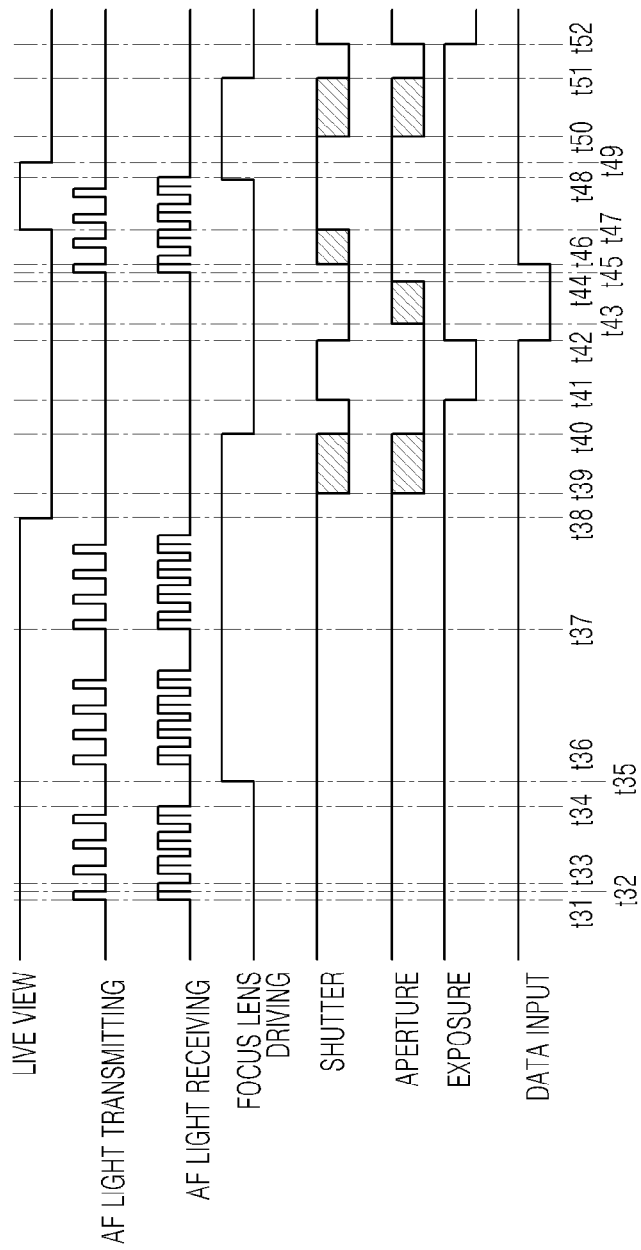
FIG. 26 is a timing diagram of an example in which TTL active AF is performed, according to an embodiment.

FIG. 26 is a timing diagram of an example in which TTL active AF is performed, according to an embodiment. From the top, live view, AF light transmitting, AF light receiving, focus lens driving, shutter, aperture, exposure, and data input are present. In the present embodiment, a continuous shooting operation has been performed; however, when only one image is captured, the image capturing operation is the same as first photographing of the continuous shooting operation.

First, a release button is half pressed, and an AF operation starts being performed (t31). In this case, a focus lens does not need to be driven. AF light transmitting is performed by a light-transmitting unit at t31, and simultaneously, AF light receiving is performed by a light-receiving unit. That is, reflected light is received at a position at which a light-receiving sensor is not properly focused on.

Subsequently, AF light transmitting and AF light receiving are not performed (t32), and simultaneously, image data is read, and AF light receiving is performed by the light-receiving sensor so that the next light receiving operation may be performed. Then, AF light receiving is stopped (t33).

Both reflected light corresponding to external light and reflected light corresponding to AF light transmitting are received between t31 and t32, and only reflected light corresponding to external light is received between t32 and t33. Thus, a difference between first light-received data and second light-received data is calculated using the image retaining unit 111 and the calculation unit 112 of FIG. 1, so as to calculate differential data. As a result, only a reflected light signal generated by light transmitting is extracted by removing external light components from the first light-received data. The operation is repeatedly performed so as to integrate the differential data. That is, the light-transmitting unit undergoes a kind of modulation, and the light-receiving unit synchronizes with the modulation of the light-transmitting unit so as to obtain a difference between light-transmitted data and light-received data.

Here, a time between t31 and t32 and a time between t32 and t33 are the same. The times are determined based on a magnitude of a received light signal, i.e., brightness. For example, the times may be several μs to several ms.

By performing the above-described operation, four-time integration of differential data is terminated at t34. In the present embodiment, the number of differential data integration is set to four times; however, this is just an example, and the number of differential data integration may vary in various ways according to external conditions.

Next, a focal position is detected from integral data so as to start driving the focus lens (t35).

The focal position may be detected by performing an arithmetic operation once so as to obtain an in-focused state; however, TTL active AF restarts while the focus lens is driven, in consideration of a case in which a subject is moved, a case in which a panning operation is performed using a digital photographing apparatus, or a case in which a function used in calculating a driving quantity for driving the focus lens varies during AF (t36).

A third TTL active AF operation starts being performed at t37. The operation is repeatedly performed until driving of the focus lens is terminated. The number of repetitions may vary according to the focus lens, a defocus quantity, or the like.

Next, display of a live view image is terminated, and preparation for a release operation is performed (t38). Even in this case, driving of the focus lens is continuously performed.

By starting the release operation, driving of a shutter and an aperture starts (t39), and after the shutter is in a closed state, and the aperture is adjusted to an appropriate aperture value, driving of the shutter and the aperture is terminated (t40). Simultaneously, driving of the focus lens is terminated at t40. Conversely, timing of t38 and t39 is set so that driving of the focus lens may be terminated at t38 and t39.

Next, if preparation for image capturing is terminated, the shutter is opened, and the image capturing device is exposed for a predetermined exposure time (t41~t42). After exposure is terminated, image data of the subject is read (t42~t46).

The aperture is returned to an open state between t43 and t44. Since reading of the image data is performed, the shutter is maintained in a closed state. TTL active AF starts being performed during continuous shooting (t45). This is the same as the operation at t31. The shutter is driven to be in an open state between t45 and t46. That is, the AF operation starts being performed regardless of the shutter in the open state. In addition, when the shutter is in the open state, the live view image is re-displayed (t47).

The focal position is detected at t48, and driving of the focus lens starts. An in-focused state is established at t51. Display of the live view image is terminated at t49. In addition, the shutter and the aperture are driven between t50 and t51. The AF operation and the exposure operation are repeatedly performed, as described above.

In the above-described method, a time for focus detecting during the continuous shooting operation is about 100 µs to about several tens of ms. Driving of the focus lens is performed during a release time lag. Thus, the number of continuous shooting operations may be easily increased. In addition, since the focal position is calculated by one time measurement, a movement-predicting arithmetic operation may be easily performed. High-speed AF and high-speed continuous shooting may be easily performed compared to contrast AF that requires a time of several tens of ms to several hundreds of ms during the continuous shooting operation.

Figure 27:
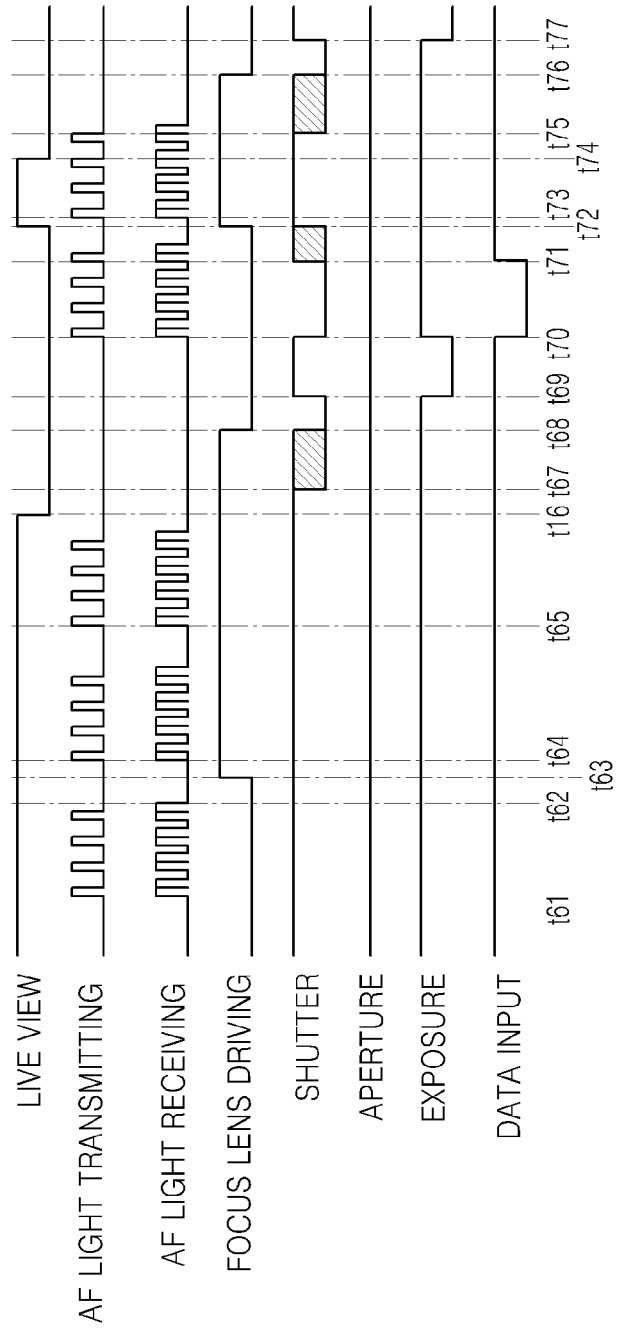
FIGS. 27 through 29 are timing diagrams of an example in which TTL active AF is performed, according to other embodiments.

FIG. 27 is a timing diagram of an example in which TTL active AF is performed, according to another embodiment. In the present embodiment, a pellicle mirror is used as an optical film, and a visible light source is used as an AF light-transmitting light source. In addition, in order to perform high-speed continuous shooting, a mode in which an aperture is opened and is controlled, or a mode in which the aperture is fixed to a particular F-value, for example, F7.0, is assumed.

Operations up to t70 are the same as the operations up to t42 of FIG. 26, except for fixing and controlling the aperture. At t70, image data of a subject obtained by exposure is read, and simultaneously, TTL active AF during continuous shooting starts being performed. This is the same as an operation at t61.

Since a beam of light for AF is not limited by the aperture, the AF operation may start being performed from when exposure is terminated (t70). After that, the shutter is opened (t71~t72), and driving of a focus lens starts (t72). Simultaneously, display of a live view image may start.

Next, a second TTL active AF operation may start being performed but may be omitted (t73). The following operations (t74~t77) is a redundancy of the above-described operation and thus a description thereof is omitted.

By using the above-described method, an AF starting time during continuous shooting may precede the focus detecting method illustrated in FIG. 26. Thus, continuous shooting speed may be further increased.

Figure 28:
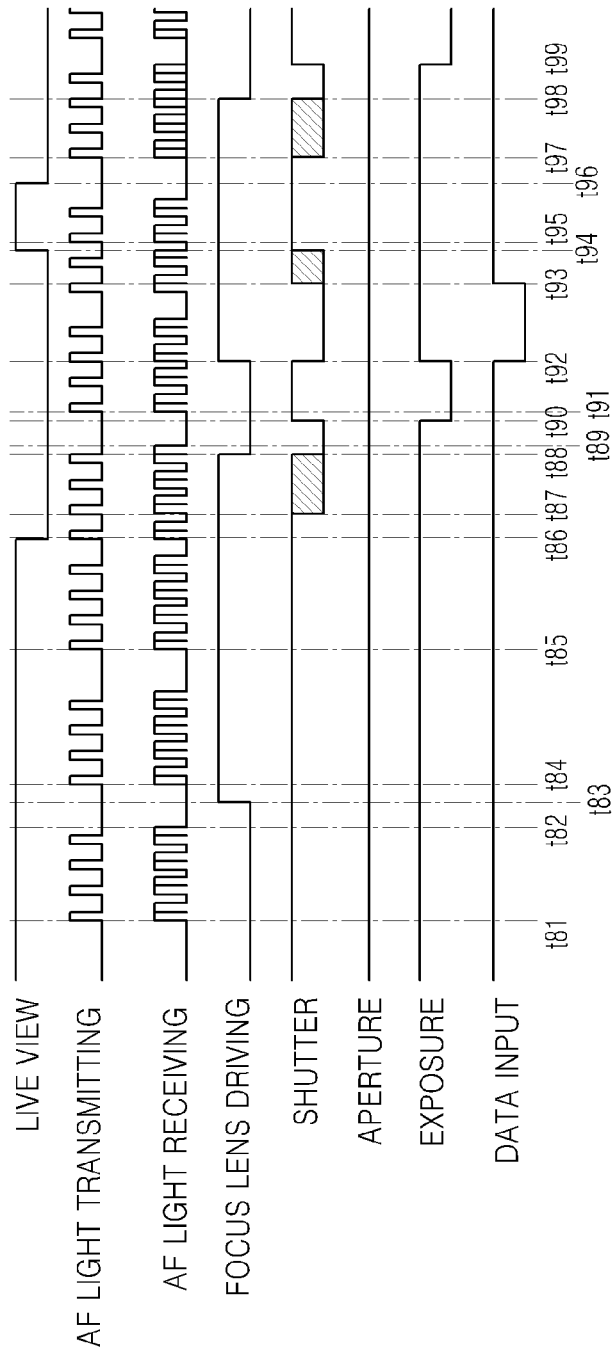

FIG. 28 is a timing diagram of an example in which TTL active AF is performed, according to another embodiment. In the present embodiment, an HOE or a pellicle mirror is used as an optical film, and an infrared light source is used as an AF light-transmitting light source. In addition, a mode in which an aperture is opened and is controlled, or a mode in which the aperture is fixed to a particular F-value, for example, F7.0, is assumed.

The present embodiment is similar to that of FIG. 27 but TTL active AF is performed during exposure. That is, a focal position may be detected by performing TTL active AF at a time between t86 and t89. As such, AF reaction speed may be increased while more AF detecting operations are performed. In addition, the focal position may be detected by performing TTL active AF during exposure at a time between t90 and t92. By blocking infrared light of light that is incident on an image capturing device, an AF operation may be performed during exposure, as described above.

A focus lens is driven at a time between t83 and t88. When the focus lens is driven, the AF operation is repeatedly performed based on up-to-date information regarding the focal position. Thus, driving of the focus lens and focus detecting by TTL active AF do not need to be synchronized with each other. However, when a DC motor requiring a relatively long time to make focus lens driving speed uniform is used, the DC motor may be in a standby state until the speed of the focus lens is uniform.

Figure 29:
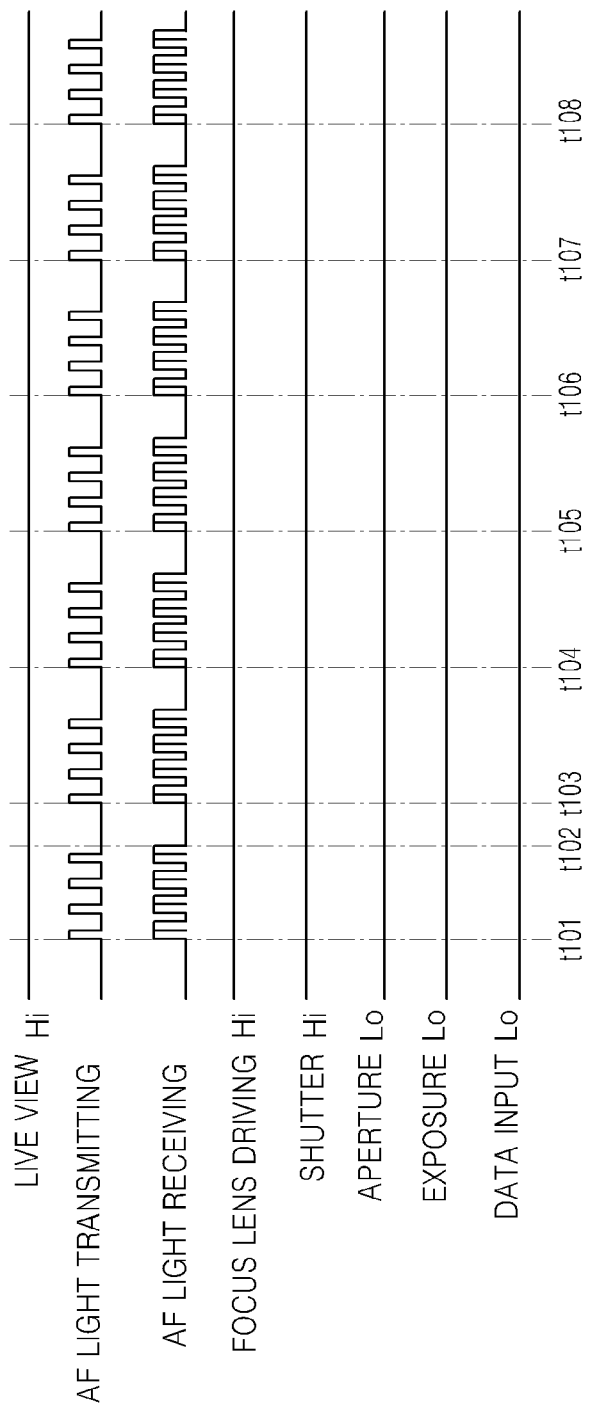

FIG. 29 is a timing diagram of an example in which TTL active AF is performed, according to another embodiment. In the present embodiment, a moving picture is captured. An HOE, a pellicle mirror, or the like is used as an optical film, and an infrared light source is used as an AF light-transmitting light source. In addition, a mode in which an aperture is opened and is controlled, or a mode in which the aperture is fixed to a particular F-value, for example, F7.0, is assumed.

In the present embodiment, focus detecting by performing TTL active AF is always performed at regular intervals. In addition, a focus lens is continuously driven. Of course, when an object stops and is in an in-focused state, driving of the focus lens will stop.

In the present embodiment, a moving picture is captured. Thus, the shutter is maintained in an open state, and the aperture is opened and controlled, is in an open state, or is fixed to a particular F-value, for example, F7.0. In addition, after moving picture photographing starts being performed, an image capturing device is always in an exposure state, and reading of image data is continuously performed.

FIGS. 30 through 34 are flowcharts illustrating methods of controlling a digital photographing apparatus, according to other embodiments.

Figure 30:
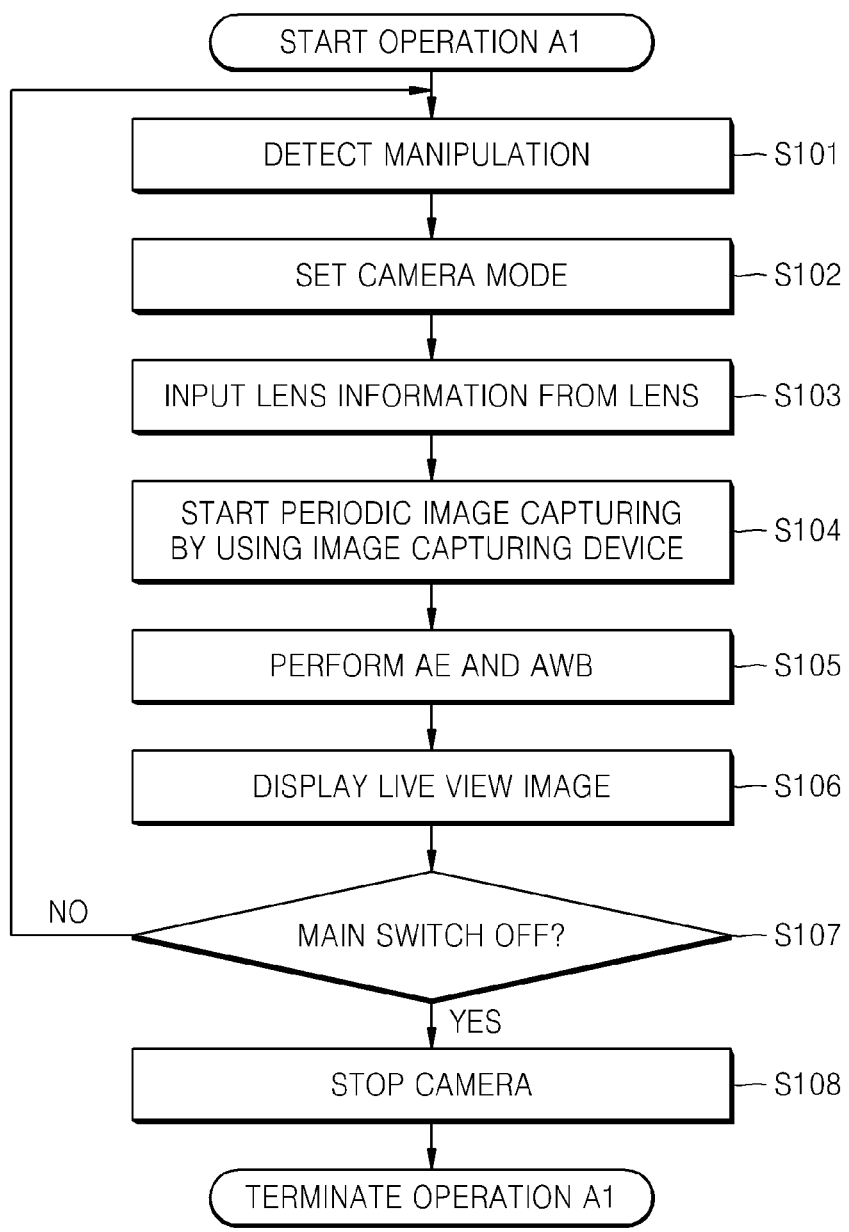
FIGS. 30 through 34 are flowcharts illustrating methods of controlling a digital photographing apparatus, according to various embodiments.

Referring to FIG. 30, when a main switch is turned on, an operation A1 starts being performed, and the digital photographing apparatus detects key or button manipulation by a user (S101). If user manipulation is detected, a mode of the digital photographing apparatus is set based on the content of the detected manipulation (S102).

Lens information is received from a lens and is input to an image capturing device (S103), and the image capturing device starts a periodic image capturing operation (S104). If an image signal is input by starting an image capturing operation, AE and AWB operations are performed (S105), and display of a live view image on which AE and AWB processing has been performed, is performed (S106).

Subsequently, it is determined whether the main switch is on (S107), if the main switch of the digital photographing apparatus is continuously turned on, the method goes back to operation S101, and if the main switch of the digital photographing apparatus is turned off, an operation of the digital photographing apparatus is terminated (S108).

Hereinafter, operations of performing TTL active AF after a release button is half pressed, TTL active Lowcon scanning, and contrast AF will be described.

Figure 31:
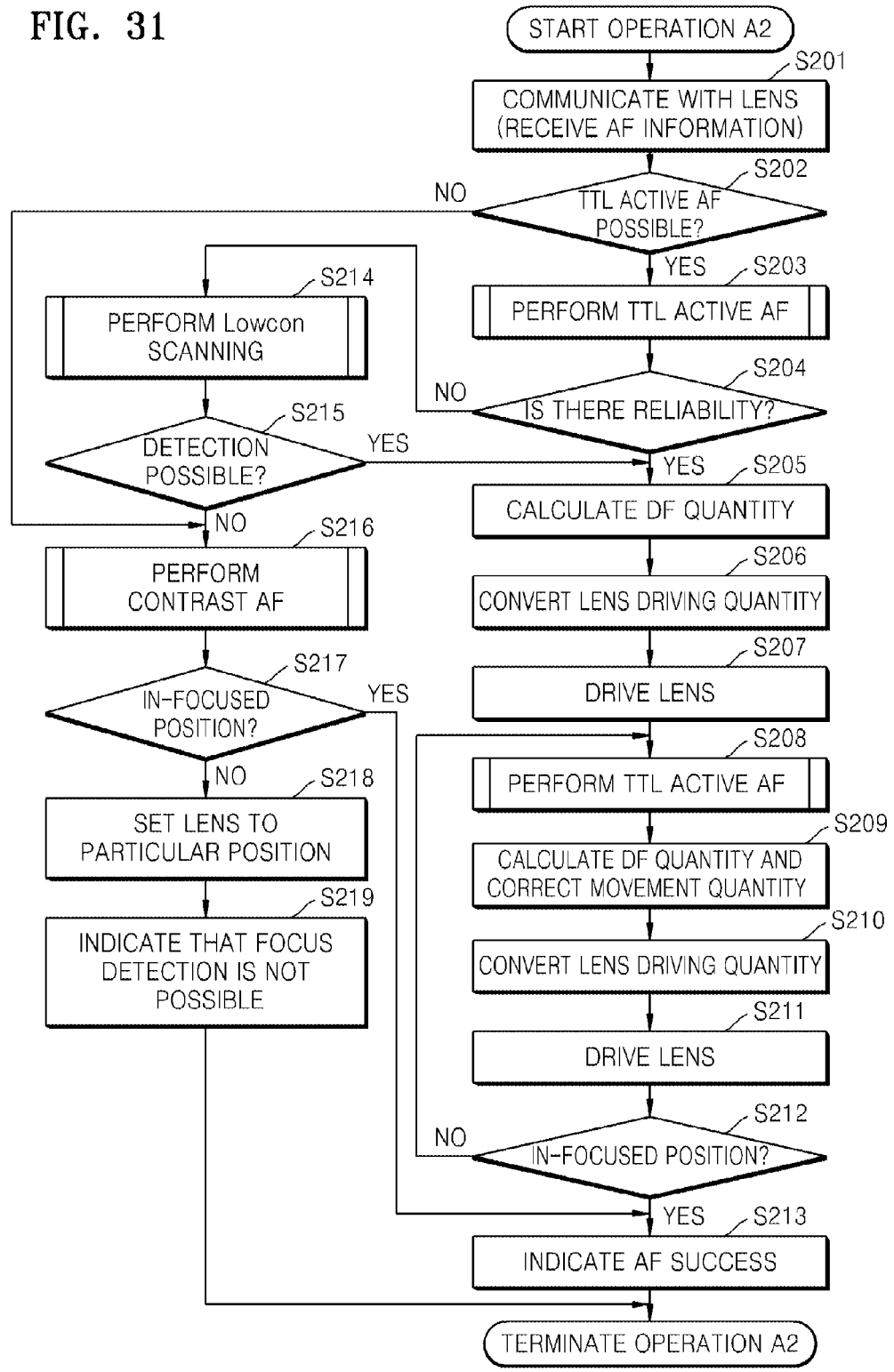

Referring to FIG. 31, the digital photographing apparatus receives up-to-date lens information (S201). For example, the up-to-date lens information includes information regarding whether an aperture is open, whether AF can be performed, or whether AF can be performed when a beam of light is F2.8 or F7.0. Subsequently, it is determined whether TTL active AF can be performed (S202).

When TTL active AF can be performed, a focal position of a subject is measured by performing TTL active AF, and when TTL active AF cannot be performed, the method proceeds to operation S216, and contrast AF is performed. Operation S203 will be described with reference to an additional subroutine illustrated in FIG. 32.

Next, in operation S203, the focal position of the subject is measured, and in operation S204, it is determined whether the measurement result is reliable. If it is determined in operation S204 that the measurement result is reliable, the method proceeds to operation S205, and if it is determined in operation S204 that the measurement result is not reliable, the method proceeds to operation S214.

If it is determined in operation S204 that the measurement result is reliable, a defocus quantity is calculated in operation S205, and the calculated defocus quantity is converted into a driving quantity of a focus lens in operation S206. The focus lens is driven toward the focal position according to the driving quantity in operation S207.

While the focus lens is driven, TTL active AF is repeatedly performed in operation S208. Subsequently, as in the preceding operation, the defocus quantity is calculated so as to correct a movement quantity in operation S209. The calculated defocus quantity is converted into the driving quantity of the focus lens in operation S210, and the focus lens is driven in operation S211.

In operation S212, it is determined whether the focus lens is at the focal position, i.e., in an in-focused state. If it is determined that the focus lens is not at the focal position, i.e., not in the in-focused state, the method goes back to operation S208, and if it is determined that the focus lens is in the in-focused state, it is indicated that an AF operation has been successfully performed, and a series of operations are terminated in operation S213.

If it is determined in operation S204 that the detection result is not reliable, the method proceeds to operation S214, and a Lowcon scanning operation is performed. The above operation is to perform TTL active AF by scanning the focus lens until a detectable area is formed. A detailed description thereof will be described with reference to an additional subroutine of FIG. 33.

In operation S215, it is determined if the focal position of the subject is measured in operation S214. If the focal position of the subject is measured in operation S214, the method goes back to operation S205, and if the focal position of the subject is not measured in operation S214, the method goes to operation S216, and a contrast AF operation is performed. A detailed description of the contrast AF operation will be described with reference to an additional subroutine of FIG. 34.

As a result of performing the contrast AF operation, it is determined if focal position measure is possible and if the focal position is detected (S217). If focal position measurement is possible and the focal position is detected, the method proceeds to operation S213. If not, the focus lens is set to a particular position in operation S218, and it is indicated that focus detection is not possible, and a series of operations are terminated in operation S219.

The series of operations are performed in a single AF mode. In a continuous AF mode, the series of operations are not terminated, and the method goes back to operation S201, and the series of operations are repeatedly performed.

Figure 32:
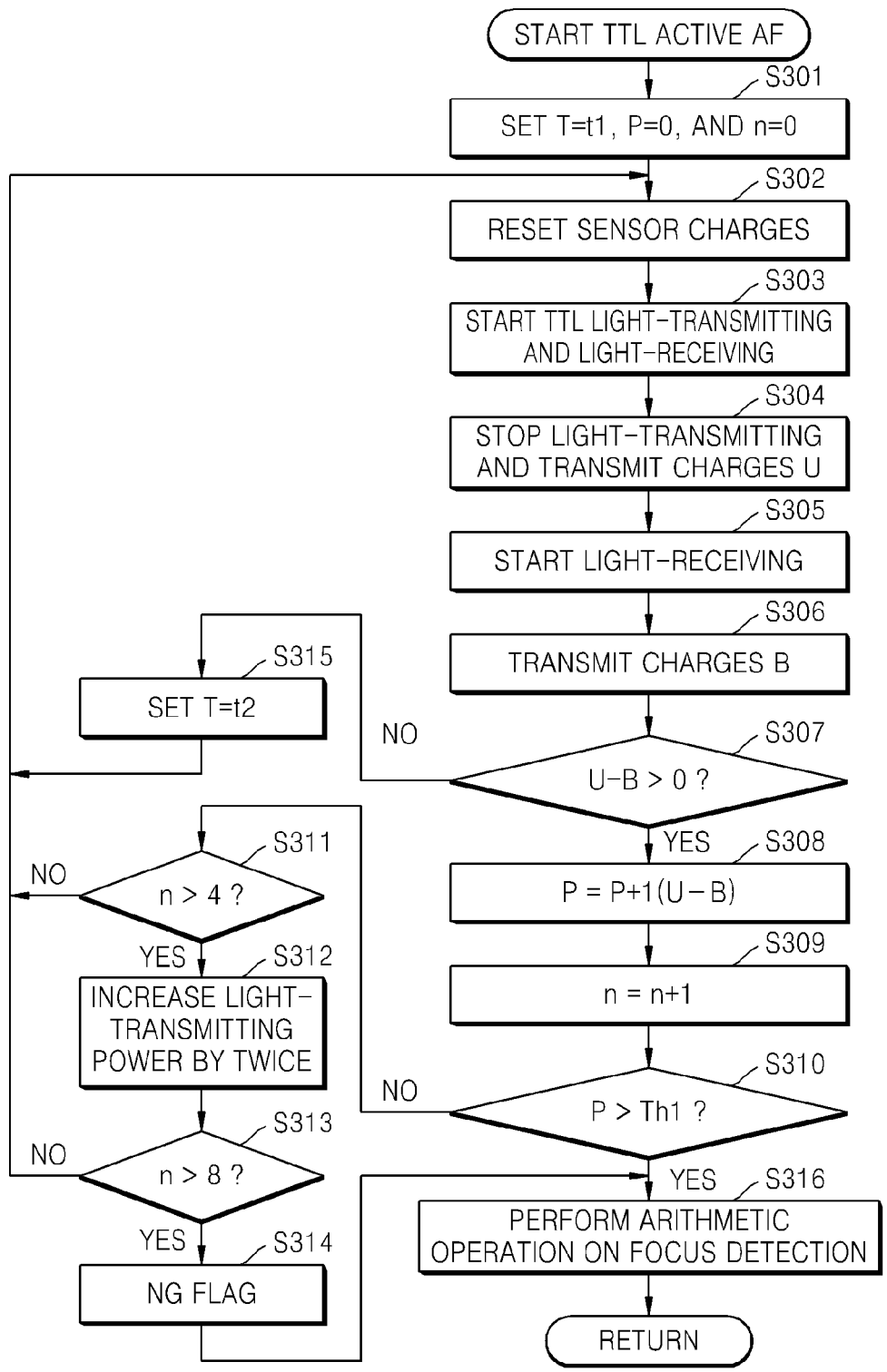

FIG. 32 is a flowchart illustrating a subroutine of TTL active AF.

If a TTL active AF operation starts being performed, first, initial values are set (operation S301). That is, a light-transmitting time and light-receiving integration time T is set to t1, an integral value P of a reflected light signal is set to 0, and the number of light-transmitting operations of TTL active AF is set to 0. A light-receiving sensor of a light-receiving unit resets charges before starting light receiving in operation S302.

If the preparation operation is terminated, light-transmitting and light-receiving for TTL active AF start being performed in operation S303. If a preset time T has elapsed, light-transmitting is stopped, and charges U of the light-receiving sensor are transmitted in operation S304. Here, U includes information regarding reflected light generated by light-transmitting and information regarding reflected light generated by external light.

Next, the reflected light generated by external light is received in a state where AF light-transmitting of a light-transmitting unit is stopped, i.e., in a non-emission state, in operation S305. After the same time T has elapsed, charges B accumulated on the light-receiving sensor are transmitted in operation S306. Here, B includes only information regarding reflected light generated by external light.

Next, it is determined whether U−B has a positive value, i.e., whether a U-value is larger than a B-value in operation S307. If the U-value is larger than the B-value, the method proceeds to operation S308, and P+(U−B) is input to a P-value in operation S308. Then, n+1 is input as an n-value in operation S309. That is, a counting value of the number of light-transmitting operations and the number of integration operations is increased by one.

It is determined whether an integral value P exceeds a threshold value Th1 in operation S310. If it is determined in operation S310 that the integral value P exceeds the threshold value Th1, it is determined that there is reliability of data, and the method proceeds to operation S316. An arithmetic operation for detecting a focal position is performed in operation S316. Then, the method escapes from the subroutine.

On the other hand, if it is determined in operation S310 that the integral value P does not exceed the threshold value Th1, it is determined that there is no reliability of data, and the method proceeds to operation S311, and it is determined whether the n-value exceeds 4 in operation S311. If it is determined in operation S311 that the n-value does not exceed 4, the method goes back to operation S302, and light-transmitting, light-receiving, and integration operations are repeatedly performed. If it is determined in operation S311 that the n-value exceeds 4, it is determined that, even though the integration operation has been repeatedly performed four times, there is no reliability of data, and light-transmitting power of the light-transmitting unit is doubled in operation S312. It is determined whether the n-value exceeds 8 in operation S313, and if it is determined in operation S313 that the n-value does not exceed 8, light-transmitting, light-receiving, and integration operations are repeatedly performed. Conversely, if it is determined in operation S313 that the n-value exceeds 8, it is determined that reliability of data is low, and an NG flag is set in operation S314 to indicate no reliability of AF detection, and the method returns to the previous operation. That is, in TTL active AF, if it is determined that reliability of AF detection data is low, light-transmitting power is increased, or the number of light-transmitting operations is increased so as to repeatedly perform an integration operation and thus reliability of AF detection data may be improved. If no reliability can be found, then an NG determination is made.

If the U-value is not larger than the B-value in operation S307, the preset time T is replaced with t2 in operation S315.

The method goes back to operation S302, and the preset time T is converted so as to increase light-transmitting power and detection capability.

The TTL active AF operation is performed by the above-described operation.

Figure 33:
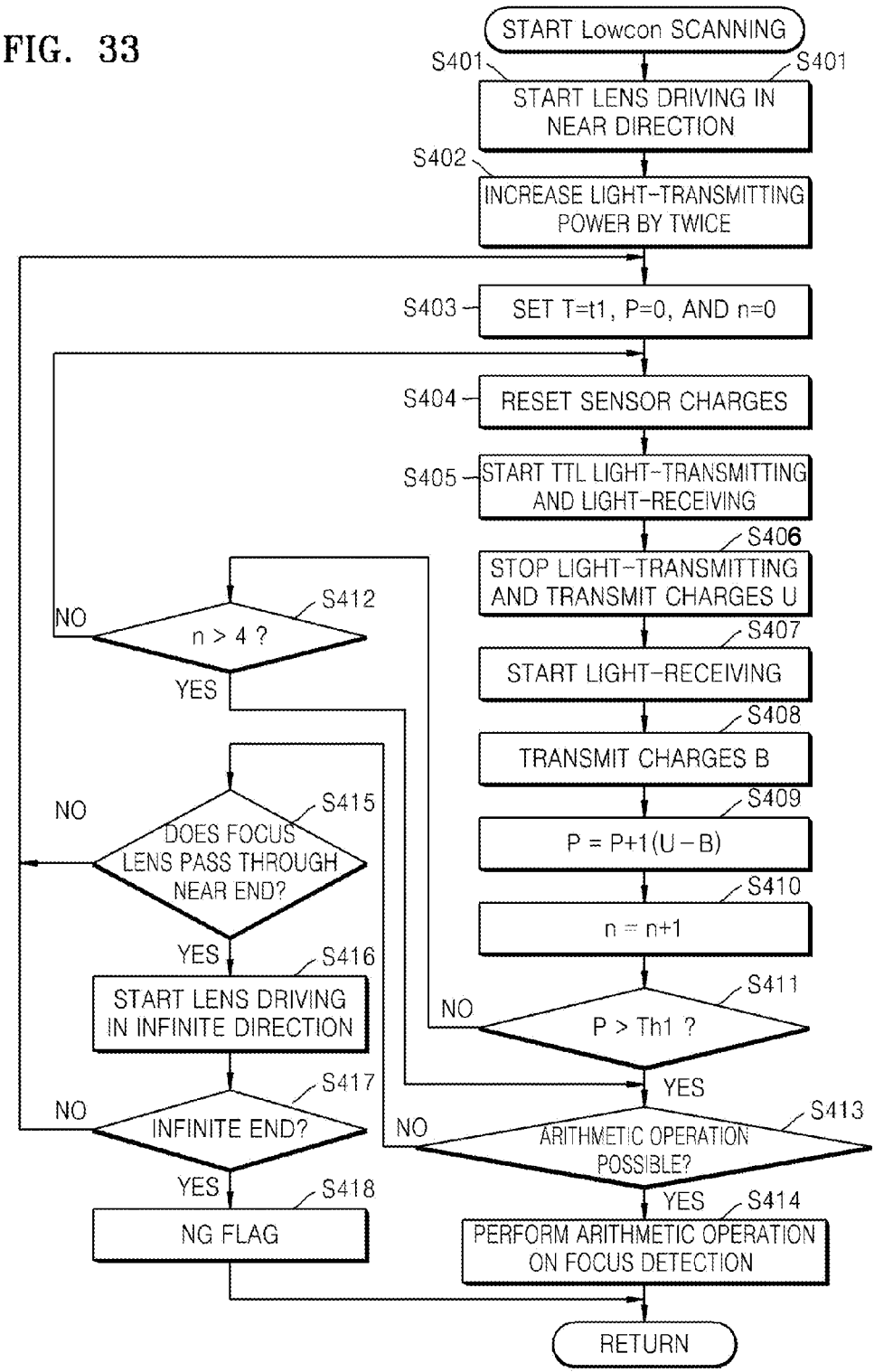

FIG. 33 is a flowchart illustrating a subroutine of a Lowcon scanning operation of TTL active AF.

If the Lowcon scanning operation starts being performed, a focus lens is driven in a near direction in operation S401. While the Lowcon scanning operation is performed, light-transmitting power is doubled in operation S402, to improve a detection capability.

Next, initial values for performing the Lowcon scanning operation are set in operation S403. That is, a light-transmitting time and light-receiving integration time T is set to t1, an integral value P of a reflected light signal is set to 0, and the number n of light-transmitting operations by TTL active AF is set to 0. A light-receiving sensor of a light-receiving unit resets charges before starting light-receiving in operation S404.

If the preparation operation is terminated, light-transmitting and light-receiving for TTL active AF start being performed in operation S405. If a preset time T has elapsed, light-transmitting is stopped, and charges U of the light-receiving sensor are transmitted in operation S406. Here, U includes information regarding reflected light generated by light-transmitting and information regarding reflected light generated by external light.

Next, the reflected light generated by external light is received in a state where AF light-transmitting of a light-transmitting unit is stopped, i.e., in a non-emission state, in operation S407. After the same time T has elapsed, charges B accumulated on the light-receiving sensor are transmitted in operation S408. Here, B includes only information regarding reflected light generated by external light.

Next, P+(U−B) is input to a P-value in operation S409. Then, n+1 is input as an n-value in operation S410. That is, a counting value of the number of light-transmitting operations and the number of integration operations is increased by one.

It is determined whether an integral value P exceeds a threshold value Th1 in operation S411. If it is determined in operation S411 that the integral value P exceeds the threshold value Th1, it is determined that a focal position of a subject can be measured, the method proceeds to operation S413. If not, it is determined whether the n-value exceeds 4 in operation S412. If it is determined in operation S412 that the n-value does not exceed 4, the method goes back to operation S404, and light-transmitting, light-receiving, and integration operations are repeatedly performed.

If it is determined in operation S412 that the n-value exceeds 4, or if it is determined in operation S411 that the integral value P exceeds the threshold value Th1, it is determined whether an arithmetic operation of focus detection can be performed in operation S413. When the method proceeds from operation S412, the arithmetic operation of focus detection may not be performed.

If it is determined in operation S413 that the arithmetic operation of focus detection can be performed, a position of an image of reflected light is detected using information regarding P. An arithmetic operation of focal position detection is performed using the detection result in operation S414, and the method escapes from the subroutine.

On the other hand, if it is determined that the arithmetic operation of focus detection cannot be performed, it is determined whether the focus lens passes through a near end in operation S415. If the focus lens passes through the near end, the focus lens is driven in an infinite direction in operation S416. That is, a reverse TTL active AF operation is performed. Then, it is determined whether the focus lens is located in an infinite end in operation S417.

If the focus lens does not pass through the near end in operation S415, or if the focus lens is not located in the infinite end in operation S417, the method goes back to operation S403 in order to perform the scanning operation continuously. If it is determined that the focus lens is located in the infinite end in operation S417, it is determined that focus detection has failed, and an NG flag is set, and the method escapes from the subroutine in operation S418.

The Lowcon scanning operation is performed by the above-described operation.

Figure 34:
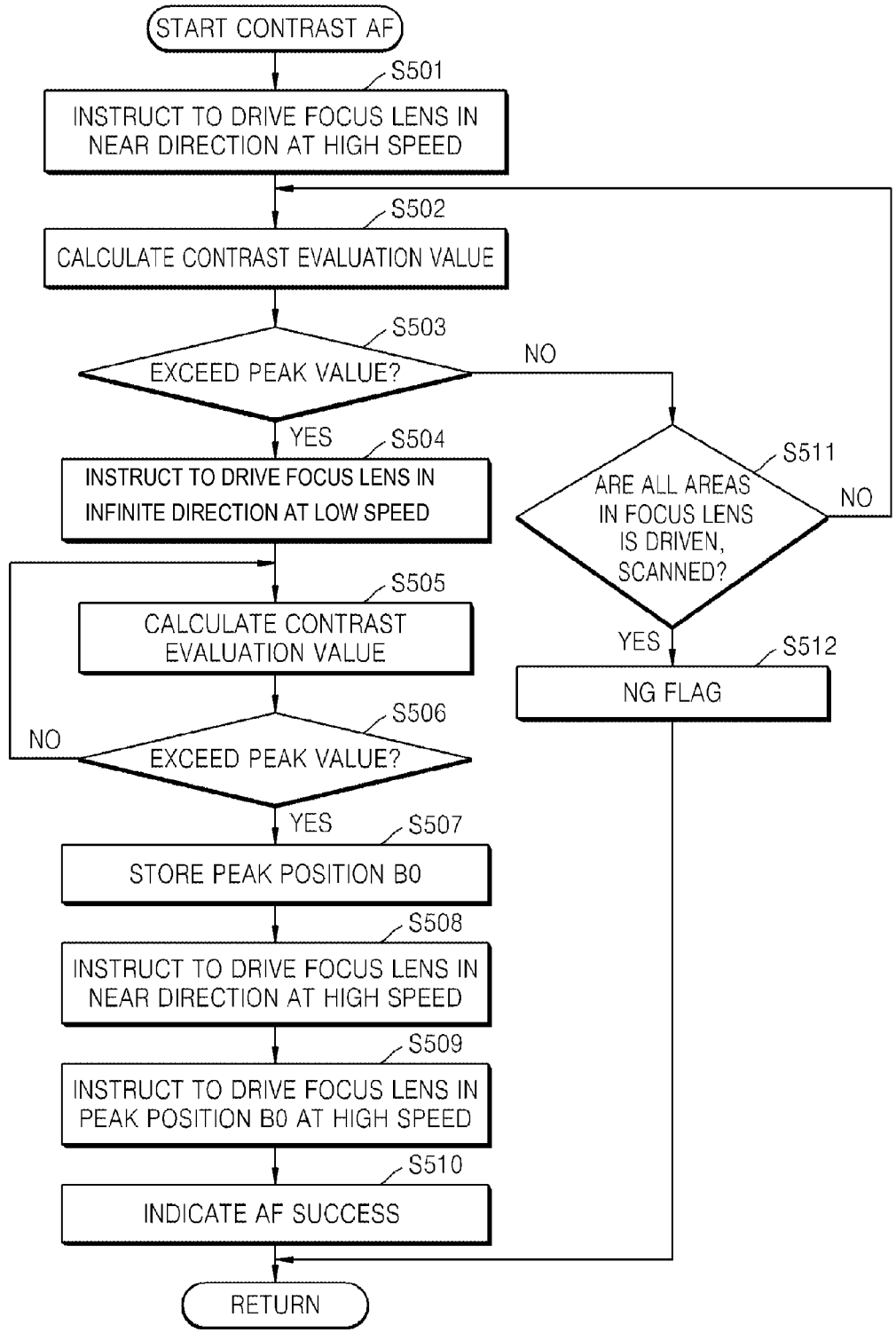

FIG. 34 is a flowchart illustrating a subroutine of a contrast AF operation.

If the contrast AF operation starts being performed, a digital photographing apparatus instructs that a focus lens be driven in a near direction at high speed in operation S501. While the focus lens is driven, AF detection, i.e., calculation of a contrast evaluation value, is performed in operation S502.

It is determined whether the contrast evaluation value exceeds a peak value in operation S503. If it is determined in operation S503 that the contrast evaluation value does not exceed the peak value, operation S511 is performed. In operation S511, it is determined whether all areas in which the focus lens is driven, are scanned. If all area scanning is not terminated, then the method returns to operation S502, and AF detection is continuously performed. If all area scanning is terminated, then in operation S512, an NG flag is set to indicate that an in-focused position is not obtained, and the method returns to the previous operation. On the other hand, if the contrast evaluation value exceeds the peak value, the digital photographing apparatus instructs that the focus lens be driven in an infinite direction at high speed in operation S504. The speed of driving of the focus lens is reduced so as to detect a precise peak position.

While the focus lens is driven in a reverse direction in S504, the contrast evaluation value is re-calculated in operation S505, and it is determined whether the contrast evaluation value exceeds the peak value in operation S506. If the contrast evaluation value does not exceed the peak value, the method goes back to operation S505, and if the contrast evaluation value exceeds the peak value, a detected peak value BO is stored in operation S507.

In order to correct back rush that occurs due to a direction in which the focus lens is driven, the focus lens is driven in a near direction by a predetermined quantity at a high speed so as to pass through the peak position in operation S508. After the focus lens passes through the peak position, the driving direction of the focus lens is changed, and the digital photographing apparatus instructs that the focus lens be driven toward the peak position BO at high speed in operation S509. If the focus lens is located in the focal position, it is indicated that an AF operation has been successfully performed, or a preparation flag for success indication is set in operation S510, and the method escapes from the subroutine. The contrast AF operation is performed by the above-described operation.

As described above, in a focus detecting apparatus having the above structure according to the one or more embodiments of the invention, AF may be continuously performed during a continuous photographing operation and in a low brightness environment.

While the invention has been particularly shown and described with reference to exemplary embodiments thereof, it will be understood by those of ordinary skill in the art that various changes in form and details may be made therein without departing from the spirit and scope of the invention as defined by the following claims.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A focus detecting apparatus comprising:
  an image capturing lens that allows light from a subject to be transmitted through the image capturing lens;
  a light-transmitting unit that emits a beam of light having a predetermined wavelength through the image capturing lens in order to perform active Auto-Focusing;
  a light-receiving unit that receives the beam of light through the image capturing lens emitted by the light-transmitting unit; and
  an optical film that reflects the beam of light that has passed through the image capturing lens and comprises one selected from the group consisting of a holographic optical element, a diffractive optical element, and a pellicle mirror, wherein:
the beam of light emitted from the light-transmitting unit is reflected on the optical film, passes through a first exit pupil area on one side of an optical axis of the image capturing lens, and is transmitted to the subject,
the beam of light reflected from the subject passes through a second exit pupil area on another side of the optical axis of the image capturing lens, is reflected on the optical film, and is received by the light-receiving unit, and
a focal position is obtained by using information regarding a position of the beam of light received by the light-receiving unit,
wherein, both the emitted light passing through the first exit pupil area and the received light passing through the second pupil area pass above the optical axis, or both the emitted light passing through the first exit pupil area and the received light passing through the second pupil area pass under the optical axis.

2. The focus detecting apparatus of claim 1, wherein each of the first and second exit pupil areas is defined in a range of a particular F-value of the image capturing lens.

3. The focus detecting apparatus of claim 2, wherein the particular F-value is smaller than a minimum open F-value of the image capturing lens.

4. The focus detecting apparatus of claim 1, wherein the optical film reflects the beam of transmitted light and the beam of received light using one screen.

5. The focus detecting apparatus of claim 1, wherein the focal position is obtained based on a phase difference between the beam of transmitted light and the beam of received light.

6. The focus detecting apparatus of claim 1, wherein a quantity of deviation from the focal position of the image capturing lens is obtained by performing an arithmetic operation on a variation in relative positions of the beam of transmitted light and the beam of received light on a conjugate plane of an image capturing plane.

7. A focus detecting apparatus comprising:
an image capturing lens that allows light from a subject to be transmitted through the image capturing lens;
a light-transmitting unit that that emits a beam of light having a predetermined wavelength through the image capturing lens in order to perform active Auto-Focusing;
a light-receiving unit that receives the beam of light through the image capturing lens emitted by the light-transmitting unit; and
an optical film for reflecting the beam of light that has passed through the image capturing lens,
wherein:
the beam of light emitted from the light-transmitting unit is reflected on the optical film, passes through a first exit pupil area on one side of an optical axis of the image capturing lens, and is transmitted to the subject,
the beam of light reflected from the subject passes through a second exit pupil area on another side of the optical axis of the image capturing lens, is reflected on the optical film, and is received by the light-receiving unit,
a focal position is obtained by using information regarding a position of the beam of light received by the light-receiving unit, and each of the first and second exit pupil areas is defined in a range of a particular F-value of the image capturing lens,
wherein, both the emitted light passing through the first exit pupil area and the received light passing through the second pupil area pass above the optical axis, or both the emitted light passing through the first exit pupil area and the received light passing through the second pupil area pass under the optical axis.

8. The focus detecting apparatus of claim 7, wherein the particular F-value is smaller than a minimum open F-value of the image capturing lens.

9. The focus detecting apparatus of claim 7, wherein the optical film reflects the beam of transmitted light and the beam of received light using one screen.

10. The focus detecting apparatus of claim 7, wherein the optical film comprises an optical element that non-specularly reflects the beam of transmitted light and the beam of received light.

11. The focus detecting apparatus of claim 7, wherein the optical film comprises an optical element that reflects only light having a particular wavelength and is located between the image capturing lens and an image capturing plane.

12. The focus detecting apparatus of claim 10, wherein the optical element comprises a holographic optical element or a diffractive optical element.

13. The focus detecting apparatus of claim 7, wherein the focal position is obtained based on a phase difference between the beam of transmitted light and the beam of received light.

14. The focus detecting apparatus of claim 7, wherein a quantity of deviation from the focal position of the image capturing lens is obtained by performing an arithmetic operation on a variation in relative positions of the beam of transmitted light and the beam of received light on a conjugate plane of the image capturing plane.

15. The focus detecting apparatus of claim 7, wherein the light-receiving unit comprises a position sensitive device (PSD), an area sensor (AD), or a line sensor.

16. The focus detecting apparatus of claim 7, wherein the light-receiving unit is disposed at a position in a conjugate plane of the image capturing plane.

17. The focus detecting apparatus of claim 7, wherein the light-receiving unit comprises a line sensor, and the line sensor is disposed in a line arrangement direction that is perpendicular to an optical axis of an image-capturing lens.

18. The focus detecting apparatus of claim 7, wherein the light-receiving unit comprises an area sensor and detects a focus by detecting a central position of reflected light that is moving.

19. The focus detecting apparatus of claim 7, wherein the light-transmitting unit undergoes modulation, and the light-receiving unit detects a focus by detecting a central position of received light from a difference between a light-transmitting output and a light-receiving output in synchronization with modulation of the light-transmitting unit.

20. A focus detecting apparatus comprising:
an image capturing lens that allows light from a subject to be transmitted through the image capturing lens;
a light-transmitting unit that emits a beam of light having a predetermined wavelength through the image capturing lens in order to perform active Auto-Focusing;
a light-receiving unit that receives the beam of light through the image capturing lens emitted by the light-transmitting unit; and
an optical film that reflects the beam of light that has passed through the image capturing lens, wherein:
  the beam of light emitted from the light-transmitting unit is reflected on the optical film, passes through a first exit pupil area on a first side of an optical axis of the image capturing lens, and is transmitted to the subject,
  the beam of light reflected from the subject passes through a second exit pupil area on a second side of the optical axis of the image capturing lens, is reflected on the optical film, and is received by the light-receiving unit,
  the beam of light reflected from the subject passes through a third exit pupil area on a third side of the optical axis of the image capturing lens, is reflected on the optical film, and is received by the light-receiving unit,
  a focal position is obtained by using information regarding a position of the beam of light from the second exit pupil area or the third exit pupil received by the light-receiving unit, and
  each of the first through third exit pupil areas is defined in a range of a particular F-value of the image capturing lens,
wherein, both the emitted light passing through the first exit pupil area and the received light passing through the second pupil area pass above the optical axis, or both the emitted light passing through the first exit pupil area and the received light passing through the second pupil area pass under the optical axis.

21. The focus detecting apparatus of claim 20, wherein beams of light having different F-values are irradiated onto the second exit pupil area and the third exit pupil area.

22. A focus detecting apparatus comprising:
  an image capturing lens that allows light from a subject to be transmitted through the image capturing lens;
  a light-transmitting unit that emits a beam of light having a predetermined wavelength in order to perform active Auto-Focusing;
  a light-receiving unit that receives the beam of light emitted by the light-transmitting unit; and
  an optical film that reflects the beam of light that has passed through the
  image capturing lens,
    wherein:
      the beam of light emitted from the light-transmitting unit is reflected on the optical film, passes through a first exit pupil area on one side of an optical axis of the image capturing lens, and is transmitted to the subject,
      the beam of light reflected from the subject passes through a second exit pupil area on another side of the optical axis of the image capturing lens, is reflected on the optical film, and is received by the light-receiving unit,
      a focal position is obtained by using information regarding a position of the beams by the light-receiving unit, and
      the beams of light emitted from the plurality of light-emitting elements are disposed to be transmitted through a plurality of subject areas,
    wherein, both the emitted light passing through the first exit pupil area and the received light passing through the second pupil area pass above the optical axis, or both the emitted light passing through the first exit pupil area and the received light passing through the second pupil area pass under the optical axis.

23. The focus detecting apparatus of claim 22, wherein lights transmitted from the plurality of light-transmitting elements are sequentially emitted, and the light-receiving unit detects a position of received light that is synchronized with the transmitted lights.

24. The focus detecting apparatus of claim 22, wherein the light-receiving unit comprises an area sensor and detects a focus by detecting a central position of reflected light that is moving.

* * * * *